US009494883B2

(12) United States Patent
Morishita et al.

(10) Patent No.: US 9,494,883 B2
(45) Date of Patent: Nov. 15, 2016

(54) ELECTROPHOTOGRAPHIC PHOTORECEPTOR AND RESIN COMPOSITION

(75) Inventors: Hironobu Morishita, Chiba (JP); Takaaki Hikosaka, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 14/001,419

(22) PCT Filed: Mar. 13, 2012

(86) PCT No.: PCT/JP2012/056476
§ 371 (c)(1),
(2), (4) Date: Aug. 23, 2013

(87) PCT Pub. No.: WO2012/124713
PCT Pub. Date: Sep. 20, 2012

(65) Prior Publication Data
US 2014/0011128 A1    Jan. 9, 2014

(30) Foreign Application Priority Data
Mar. 17, 2011   (JP) .................................. 2011-059621

(51) Int. Cl.
| G03G 15/00 | (2006.01) |
| G03G 15/04 | (2006.01) |
| G03G 5/07 | (2006.01) |
| C08L 69/00 | (2006.01) |
| G03G 5/05 | (2006.01) |
| G03G 5/147 | (2006.01) |

(52) U.S. Cl.
CPC .............. *G03G 5/076* (2013.01); *C08L 69/00* (2013.01); *G03G 5/056* (2013.01); *G03G 5/0564* (2013.01); *G03G 5/14752* (2013.01); *G03G 5/14756* (2013.01)

(58) Field of Classification Search
CPC .... G03G 5/04; G03G 5/0564; G03G 5/0578; G03G 5/0582; G03G 5/0592; C08L 69/00
USPC ........................................ 430/56, 70, 71, 96
See application file for complete search history.

(56) References Cited

U.S. PATENT DOCUMENTS

| 7,645,547 | B2 * | 1/2010 | Okuda et al. .................... 430/56 |
| 2007/0054209 | A1 * | 3/2007 | Azuma et al. .................. 430/73 |
| 2008/0199796 | A1 | 8/2008 | Minemura et al. | |
| 2011/0122957 | A1 | 5/2011 | Tamaki et al. | |

FOREIGN PATENT DOCUMENTS

| CN | 1123421 A | 5/1996 |
| CN | 101445596 A | 6/2009 |
| EP | 0 701 175 A1 | 3/1996 |
| JP | 8-6267 A | 1/1996 |
| JP | 11-172003 A | 6/1999 |
| JP | 2001-255673 A | 9/2001 |
| JP | 2001-356502 A | 12/2001 |
| JP | 2003-255569 A | 9/2003 |

(Continued)

OTHER PUBLICATIONS

Extended European Search Report issued in European Application No. 12757968.8 dated Sep. 5, 2014.
International Search Report PCT/JP2012/056476 dated May 29, 2012.

*Primary Examiner* — Thorl Chea
(74) *Attorney, Agent, or Firm* — Foley & Lardner LLP

(57) ABSTRACT

An electrophotographic photoreceptor that satisfies excellent transparency, abrasion resistance, and electrophotographic properties (including sensitivity and residual potential after light irradiation) all together is provided. Specifically, an electrophotographic photoreceptor and a resin composition that include therein (1) a polycarbonate resin (A) having a structural unit represented by the following formula (I) and (2) at least one selected from a polycarbonate resin (B) synthesized from a source material that includes therein a bisphenol represented by the following formula (II) and a polyester resin (B') synthesized from a source material that includes therein a bisphenol represented by the following formula (II). In formulas (I) and (II), each of $R^a$, $R^b$, $R^c$, $R^d$, $R^e$, and $R^f$ represents, independently from one another, a substituted or non-substituted alkyl group, a substituted or non-substituted cycloalkyl group, or a substituted or non-substituted phenyl group. Each of p, q, r, s, t, and u represents, independently from one another, an integer of 0 to 4. $R^g$ represents an alkyl group. X represents an alkylene group, an isopropylidene group, a sec-butylidene group, a cycloalkylene group, a cycloalkylidene group, or the like. Y represents a single bond or —O—. Each of $m^A$ and $n^A$ represents a composition ratio (mole ratio) of the structural unit in the round brackets.

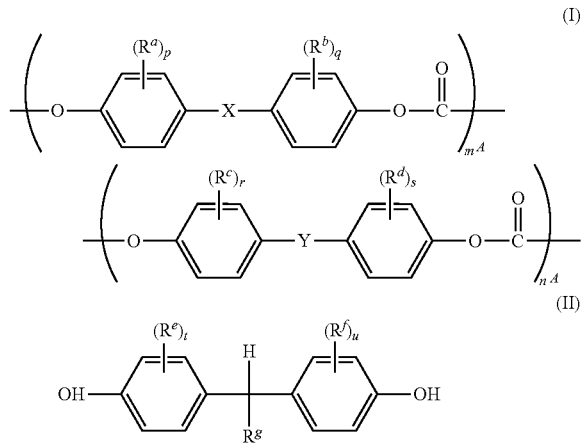

6 Claims, No Drawings

(56) References Cited

FOREIGN PATENT DOCUMENTS

| | | |
|---|---|---|
| JP | 2004-61578 A | 2/2004 |
| JP | 2006-119217 A | 5/2006 |
| JP | 2006-126492 A | 5/2006 |
| JP | 2007-102199 A | 4/2007 |
| JP | 2007-108793 A | 4/2007 |
| JP | 2007-121733 A | 5/2007 |
| JP | 2007-206130 A | 8/2007 |
| JP | 2008-203802 A | 9/2008 |
| JP | 2008-276246 A | 11/2008 |
| WO | WO 2010/150885 A1 | 12/2010 |
| WO | WO-2012/050143 A1 | 4/2012 |

* cited by examiner

ELECTROPHOTOGRAPHIC PHOTORECEPTOR AND RESIN COMPOSITION

TECHNICAL FIELD

The present invention relates to an electrophotographic photoreceptor and a resin composition.

BACKGROUND ART

In recent years, polycarbonate resin that is produced from 2,2-bis(4-hydroxyphenyl)propane (or, bisphenol A), because of having a high transparency and excellent mechanical properties, has been used in various applications including optical materials and electronic materials. One application among these is an electrophotographic photoreceptor.

Unit processes including corona charging or contact charging using rolls or brushes, toner development, image transferring to paper, and cleaning treatment are repeated on the surface of a photoreceptor of the electrophotographic photoreceptor, whereby electrical and mechanical external stresses are applied to the electrophotographic receptor on every occasion of the unit processes. Therefore, in order to maintain image quality over a long time, the photoreceptor layer that is disposed on the surface of the electrophotographic photoreceptor is required to have durabilities against the electrical and mechanical external stresses. Specifically, durabilities against development of wear or scar on the surface of the photoreceptor caused by friction and surface degradation caused by discharging or active gases such as ozone in the course of corona charging or contact charging and image transferring.

In order to meet these requests, polycarbonate resin, which has good optical properties and good compatibility with charge transporting materials used in the photoreceptor layer, has been used as a binder resin for the electrophotographic photoreceptor. However, conventional polycarbonate resin that is produced from the aforementioned bisphenol A, 1,1-bis(4-hydroxyphenyl)cyclohexane (or, bisphenol Z), and the like is not sufficient to satisfy the above requests, particularly abrasion resistance or the like.

Under the above circumstances, as a method of addressing the above problems, polycarbonate resins or polyester resins that have various molecular structures have been proposed. Furthermore, an attempt of improving the durabilities and electrophotographic properties by mixing these resins has been also reported. (Patent Documents 1 to 7). Patent Documents 1 to 6 include a report of informing that abrasion resistance is improved by mixing a specific polyester resin with a polyester resin or polycarbonate resin that has a different structure. Patent Document 7 discloses a binder resin that is a blend of a specific copolymerized polycarbonate resin and a polycarbonate resin that is obtained by using bisphenol Z solely as a dihydric phenol.

PRIOR ART DOCUMENTS

Patent Documents

Patent Document 1: Japanese Patent Laid-Open Publication No. 2001-255673
Patent Document 2: Japanese Patent Laid-Open Publication No. 2001-356502
Patent Document 3: Japanese Patent Laid-Open Publication No. 2004-61578
Patent Document 4: Japanese Patent Laid-Open Publication No. 2007-108793
Patent Document 5: Japanese Patent Laid-Open Publication No. 2008-203802
Patent Document 6: Japanese Patent Laid-Open Publication No. 2003-255569
Patent Document 7: Japanese Patent Laid-Open Publication No. 2008-276246

SUMMARY OF THE INVENTION

Problems to be Solved by the Invention

Electrophotographic photoreceptors described in Patent Documents 1 to 7 have room for further improvement in durabilities, electrophotographic properties, and the like. Note that, the electrophotographic photoreceptor described in Patent Document 7 shows improvements in oil resistance and the like by blending, but a marked improvement of abrasion resistance is not shown.

Besides the above, polyester carbonate, polycarbonate copolymers that include ternary copolymers, and the like have been proposed. However, there is still room for improvements in dispersing state of molecules, and the like.

Considering the above, it is an object of the present invention to provide an electrophotographic photoreceptor that satisfies both of excellent abrasion resistance and electrophotographic properties (including sensitivity and residual potential after light irradiation).

Means for Solving the Problems

The present inventors have made intensive studies on the above object, and found that an electrophotographic photoreceptor having both of a polycarbonate resin that has at least a specific structure and a polycarbonate resin that has a specific structure, or both of a polycarbonate resin that has at least a specific structure and a polyester resin that has a specific structure provides not only superior transparency and abrasion resistance but also excellent electrophotographic properties (including sensitivity and residual potential after light irradiation). Based on this finding, the present invention has been accomplished.

Namely, the present invention relates to the following items [1] to [9].

[1] An electrophotographic photoreceptor including therein: (1) a polycarbonate resin (A) that has a structural unit represented by the following formula (I); and (2) at least one selected from a polycarbonate resin (B) synthesized from a source material that includes therein a bisphenol represented by the following formula (II) and a polyester resin (B') synthesized from a source material that includes therein a bisphenol represented by the following formula (II).

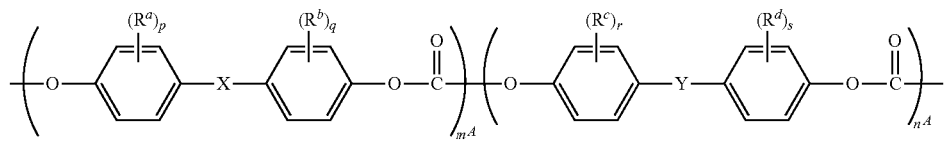

-continued

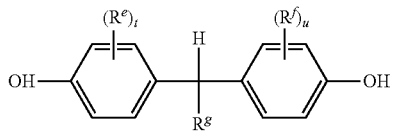

(II)

In the formulas, each of $R^a$, $R^b$, $R^c$, $R^d$, $R^e$, and $R^f$ represents, independently from one another, a halogen atom, a substituted or non-substituted alkyl group having 1 to 8 carbon atoms, a substituted or non-substituted cycloalkyl group having 3 to 8 carbon atoms, or a substituted or non-substituted phenyl group. Each of p, q, r, s, t, and u represents, independently from one another, an integer of 0 to 4. $R^g$ represents an alkyl group having 1 to 8 carbon atoms.

X represents an alkylene group having 1 to 8 carbon atoms, an isopropylidene group, a sec-butylidene group, a cycloalkylene group having 5 to 15 carbon atoms, a cycloalkylidene group having 5 to 15 carbon atoms, —S—, —SO—, —SO$_2$—, —CO—, or a divalent bonding group that is represented by the following formula (X-1) or the following formula (X-2). The benzene rings that compose formula (X-2) may be substituted by an alkyl group having 1 to 8 carbon atoms or a substituted or non-substituted phenyl group.

[2] The electrophotographic photoreceptor described in the item [1], wherein the content ratio of the polycarbonate resin (A) with respect to the total amount of the polycarbonate resin (A), the polycarbonate rein (B), and the polyester resin (B'), that is (A)/((A)+(B)+(B')), is from 0.5 to 0.99 by mass ratio.

[3] The electrophotographic photoreceptor described in the item [1] or [2], wherein the polycarbonate rein (B) has a structural unit represented by the following formula (IV) and the polyester resin (B') has a structural unit represented by the following formula (V).

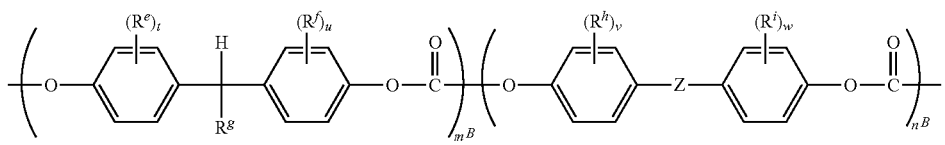

(IV)

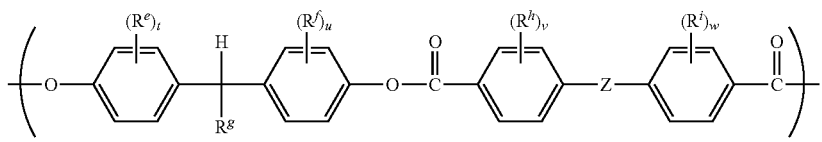

(V)

In the formulas, each of $R^e$, $R^f$, $R^g$, t, and u is the same as defined above. Each of $R^h$ and $R^i$ represents, independently from each other, a halogen atom, a substituted or non-substituted alkyl group having 1 to 8 carbon atoms, a substituted or non-substituted cycloalkyl group having 3 to 8 carbon atoms, or a substituted or non-substituted phenyl group. Each of $m^B$ and $m^B$ represents a composition ratio (mole ratio) of the structural unit in the round brackets. Each of v and w represents, independently from each other, an integer of 0 to 4. Z represents a single bond or —O—.

[4] The electrophotographic photoreceptor described in any one of the items [1] to [3], wherein Y in formula (I) represents a single bond.

[5] The electrophotographic photoreceptor described in any one of the items [1] to [4], wherein $n^A/(m^A+n^A)$ in formula (I) is from IL 1 to 0.7.

[6] The electrophotographic photoreceptor described in any one of the items [1] to [5], wherein the structural unit represented by formula (I) is a structural unit described below.

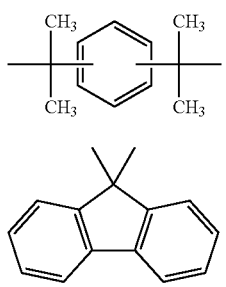

(X-1)

(X-2)

Y represents a single bond or —O—.

Each of $m^A$ and $n^A$ represents a composition ratio (mole ratio) of the structural unit in the round brackets.

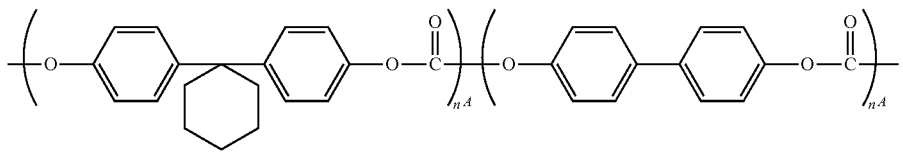

In the formula, each of $m^A$ and $n^A$ is the same as defined above.

[7] The electrophotographic photoreceptor described in any one of the items [1] to [6], includes therein, as a binder resin of a photoreceptor layer, the polycarbonate resin (A) and at least one selected from the polycarbonate resin (B) and the polyester resin (B').

[8] The electrophotographic photoreceptor described in any one of the items [1] to [7], wherein at least one selected from the polycarbonate resin (A), the polycarbonate resin (B), and the polyester resin (B') includes therein a polyalkylsiloxane structural unit represented by the following formula (VI).

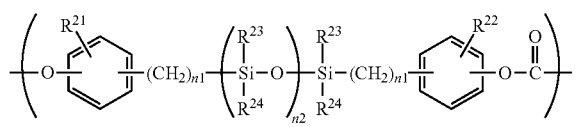

[9] A resin composition including therein (1) a polycarbonate resin (A) that has a structural unit represented by the following formula (I) and (2) at least one selected from a polycarbonate resin (B) synthesized from a source material that includes therein a bisphenol represented by the following formula (II) and a polyester resin (B') synthesized from a source material that includes therein a bisphenol represented by the following formula (II).

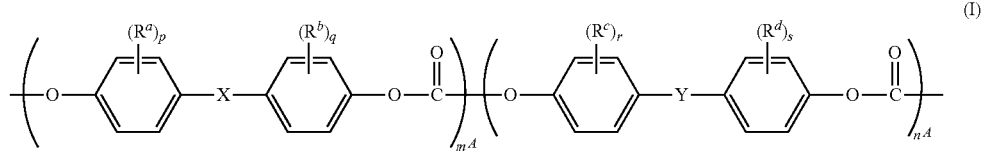

In the formulas, each of $R^a$, $R^b$, $R^c$, $R^d$, $R^e$, $R^f$, $R^g$, p, q, r, s, t, u, X, Y, $m^A$, and $n^A$ is the same as defined above.

Effect of the Invention

According to the present invention, an electrophotographic photoreceptor having excellent transparency, abrasion resistance (durability), and electrophotographic properties (including sensitivity and residual potential after light irradiation) is allowed to be provided. In addition, a resin composition having excellent mechanical strengths including high elasticity is allowed to be provided.

MODE FOR CARRYING OUT THE INVENTION

An electrophotographic photoreceptor and a resin composition according to the present invention include therein (1) a polycarbonate resin (A) that has a structural unit represented by the following formula (I) and (2) at least one selected from a polycarbonate resin (B) synthesized from a source material that includes therein a bisphenol represented by the following formula (II) and a polyester resin (B') synthesized from a source material that includes therein a bisphenol represented by the following formula (II).

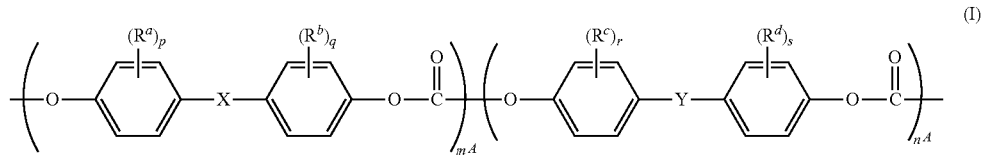

-continued

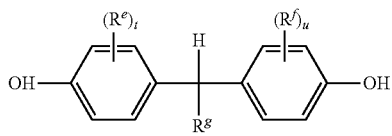

(II)

Each of $R^a$, $R^b$, $R^c$, $R^d$, $R^e$, and $R^f$ represents, independently from one another, a halogen atom, a substituted or non-substituted alkyl group having 1 to 8 carbon atoms, a substituted or non-substituted cycloalkyl group having 3 to 8 carbon atoms, or a substituted or non-substituted phenyl group. Each of p, q, r, s, t, and u represents, independently from one another, an integer of 0 to 4. $R^g$ represents an alkyl group having 1 to 8 carbon atoms.

The alkyl group having 1 to 8 carbon atoms that is represented by each of $R^a$, $R^b$, $R^c$, $R^d$, $R^e$, $R^f$, and $R^g$ independently includes: a methyl group; an ethyl group; an n-propyl group; an isopropyl group; various kinds of butyl groups ("various kinds" includes straight chains and all of branched chains; hereinafter, referred to the same as above); various kinds of pentyl groups; various kinds of hexyl groups; various kinds of heptyl groups; and various kinds of octyl groups. Among these, considering transparency, abrasion resistance, electrophotographic properties, and mechanical strength, an alkyl group having 1 to 6 carbon atoms is preferable, and an alkyl group having 1 to 3 carbon atoms is more preferable. These alkyl groups may have a halogen atom such as a fluorine atom (preferably a fluorine atom) as a substitution group. In this case, examples of the halogen-substituted alkyl groups include a trifluoromethyl group.

The halogen atom that is represented by each of $R^a$, $R^b$, $R^c$, $R^d$, $R^e$, and $R^f$ independently includes a fluorine atom, a chlorine atom, a bromine atom, and an iodine atom.

Examples of the cycloalkyl group having 3 to 8 carbon atoms that is represented by $R^a$, $R^b$, $R^c$, $R^d$, $R^e$, and $R^f$ independently include a cyclopropyl group, a cyclopentyl group, a cyclohexyl group, and a cyclooctyl group. The cycloalkyl group may have a halogen atom such as fluorine atom (preferably a fluorine atom) as a substitution group.

Examples of a substitution group of the phenyl group that is represented by $R^a$, $R^b$, $R^c$, $R^d$, $R^e$, and $R^f$ independently include the aforementioned alkyl group having 1 to 8 carbon atoms.

Each of p, q, r, s, t, and u is preferably 0 to 2 and more preferably 0 or 1, considering transparency, abrasion resistance, electrophotographic properties, and mechanical strength.

X represents an alkylene group having 1 to 8 carbon atoms, an isopropylidene group, a sec-butylidene group, a cycloalkylene group having 5 to 15 carbon atoms, a cycloalkylidene group having 5 to 15 carbon atoms, —S—, —SO—, —SO$_2$—, —CO—, or a divalent bonding group that is represented by the following formula (X-1) or the following formula (X-2).

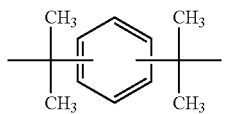

(X-1)

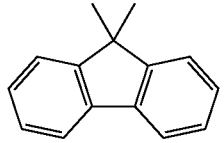

(X-2)

Examples of the alkylene group having 1 to 8 carbon atoms that is represented by X include an methylene group, an ethylene group, a trimethylene group, a tetramethylene group, and a hexamethylene group. Considering transparency, abrasion resistance, electrophotographic properties, and mechanical strength, an alkylene group having 1 to 5 carbon atoms is preferable.

Examples of the cycloalkylene group having 5 to 15 carbon atoms include cyclopentane-diyl group, a cyclohexane-diyl group, and a cyclooctane-diyl group. Considering transparency, abrasion resistance, electrophotographic properties, and mechanical u strength, a cycloalkylene group having 5 to 10 carbon atoms is preferable.

Examples of the cycloalkylidene group having 5 to 15 carbon atoms include a cyclohexylidene group, a 3,5,5-trimethylcyclohexylidene group, and a 2-adamantylidene group. A cycloalkylidene group having 5 to 10 carbon atoms is preferable and a cycloalkylidene group having 5 to 8 carbon atoms is more preferable.

Note that, the benzene rings that compose formula (X-2) may be substituted by an alkyl group having 1 to 8 carbon atoms or a substituted or non-substituted phenyl group. These alkyl groups and substitution groups include the same groups as in the case of $R^a$, $R^b$, $R^c$, $R^d$, $R^e$, $R^f$, and $R^g$. Preferable ones are also the same.

Among the ones described above, considering transparency, abrasion resistance, electrophotographic properties, and mechanical strength, X represents preferably an isopropylidene group and a cycloalkylidene group having 5 to 15 carbon atoms, more preferably a cycloalkylidene group having 5 to 15 carbon atoms, still more preferably a cycloalkylidene group having 5 to 8 carbon atoms, and particularly preferably a cyclohexylidene group.

Y represents a single bond or —O—, wherein abrasion resistance is enhanced. From this viewpoint, Y represents preferably a single bond.

Furthermore, each of $m^A$ and $n^A$ represents a composition ratio (mole ratio) of the structural unit in the round brackets in the polycarbonate resin (A). In the case of using as a binder resin for an electrophotographic photoreceptor, considering solubility to organic solvent, transparency, abrasion resistance, and electrophotographic properties, $n^A/(m^A+n^A)$ is preferably from 0.1 to 0.7 and more preferably from 0.25 to 0.70.

Note that, the polycarbonate resin (A), considering transparency, heat resistance, abrasion resistance, electrophotographic properties, and mechanical strength, includes therein a structural unit represented by formula (I) in an amount of preferably 50 mole % or more, more preferably 80 mole % or more, and still more preferably 90 mole % or more.

The polycarbonate resin (B), considering transparency, abrasion resistance, and electrophotographic properties, has preferably a structural unit represented by the following formula (IV). The polyester resin (B') has preferably a structural unit represented by the following formula (V).

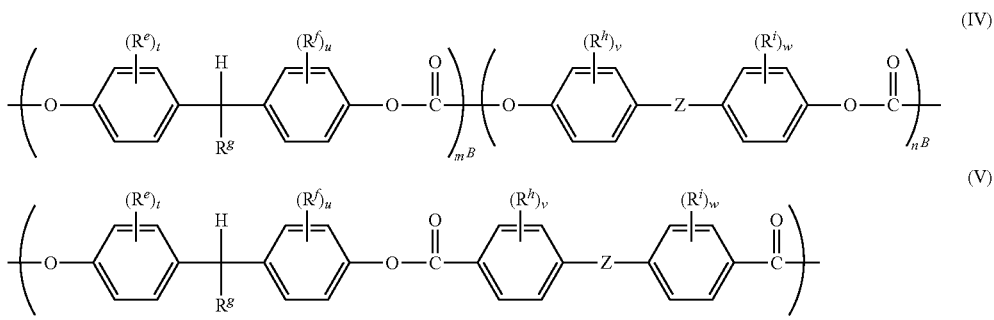

The methylene group that is sandwiched between benzene rings in the structural unit on the left side of formula (IV) and formula (V) is required to have a structure in which only one hydrogen atom is substituted by an alkyl group having 1 to 8 carbon atoms. Whereby, the polycarbonate resin (B) or polyester resin (B') that has such structure is considered to acquire an effect of keeping a balance between an effect of having good compatibility or miscibility with the polycarbonate resin (A) and a charge transporting material and an effect of suppressing crystallization. Therefore, transparency, abrasion resistance, and electrophotographic properties are still more improved.

$R^e$, $R^f$, $R^g$, t, and u are the same as defined above. Each of $m^B$ and $n^B$ represents a composition ratio (mole ratio) of the structural unit in the round brackets in the polycarbonate resin (B).

Each of $R^h$ and $R^i$ represents, independently from each other, a halogen atom, a substituted or non-substituted alkyl group having 1 to 8 carbon atoms, a substituted or non-substituted cycloalkyl group having 3 to 8 carbon atoms, or a substituted or non-substituted phenyl group. Each of v and w represents, independently from each other, an integer of 0 to 4. Z represents a single bond or —O—.

The halogen atom and the alkyl group having 1 to 8 carbon atoms are the same as specified in the case of $R^a$, $R^b$, $R^c$, $R^d$, $R^e$, $R^f$, and $R^g$. Preferable ones are also the same.

Furthermore, the cycloalkyl group having 3 to 8 carbon atoms is the same as specified in the case of $R^a$, $R^b$, $R^c$, $R^d$, $R^e$, and $R^f$. Preferable ones are also the same. The alkyl group and cycloalkyl group may be substituted by a halogen atom such as a fluorine atom (preferably a fluorine atom).

Examples of the substitution group of the phenyl group include the alkyl group having 1 to 8 carbon atoms as described above.

Each of v and w represents preferably 0 to 2, more preferably 0 or 1, and still more preferably 0, respectively.

Z represents a single bond or —O—. Whereby, abrasion resistance is enhanced.

Note that, regarding the polycarbonate resin (B), considering transparency, abrasion resistance, and electrophotographic properties, $n^B/(m^B+n^B)$ is preferably 0.1 to 0.7. In addition, the structural unit represented by formula (IV) is included therein in an amount of preferably 50 mole % or more, more preferably 80 mole % or more, and still more preferably 90 mole % or more. Regarding the polyester resin (B'), considering transparency, abrasion resistance, and electrophotographic properties, the structural unit represented by formula (V) is included therein in an amount of preferably 50 mole % or more, more preferably 80 mole % or more, more preferably 90 mole % or more, still more preferably 95 mole % or more, and particularly preferably substantially 100 mole %.

Preferable specific examples of the polycarbonate resin (A) are shown below, but they are not particularly limitative.

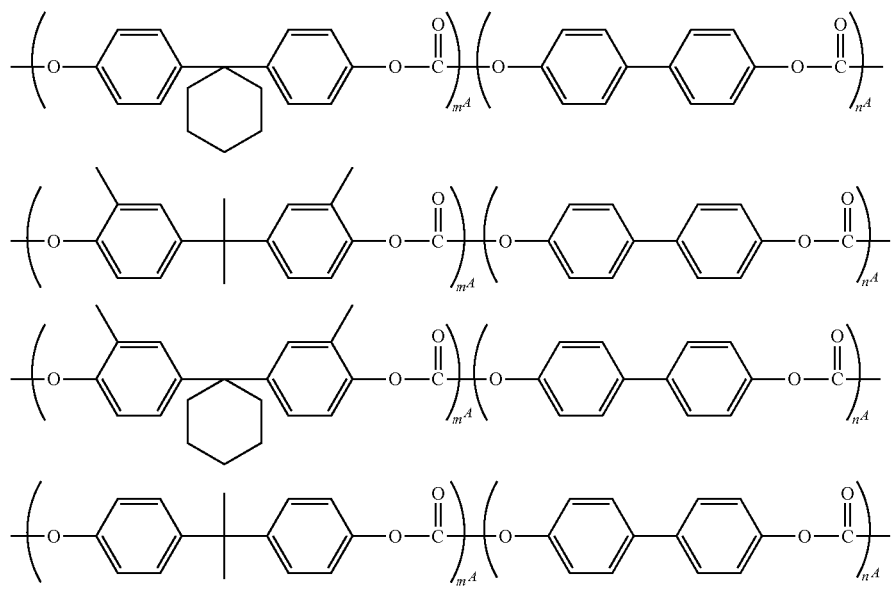

-continued
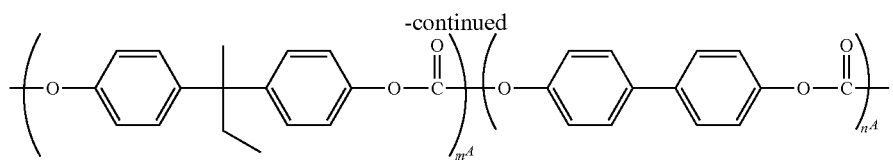
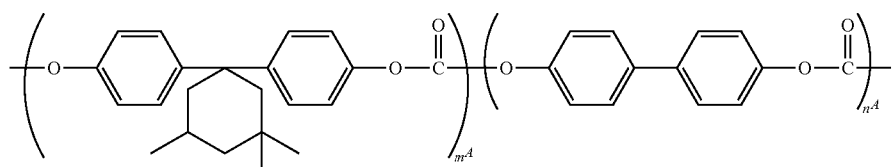
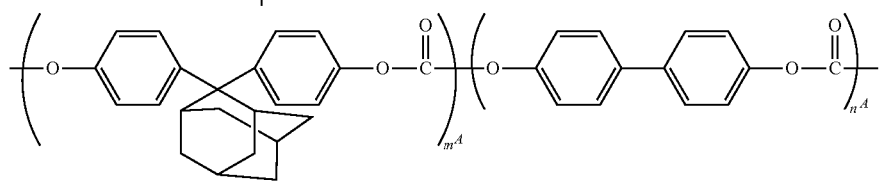
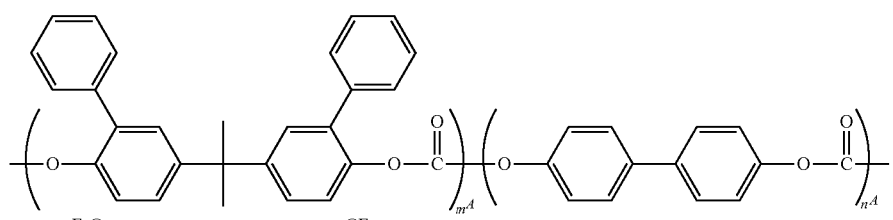
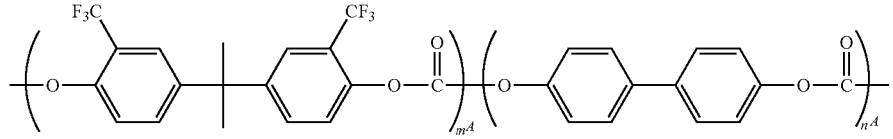
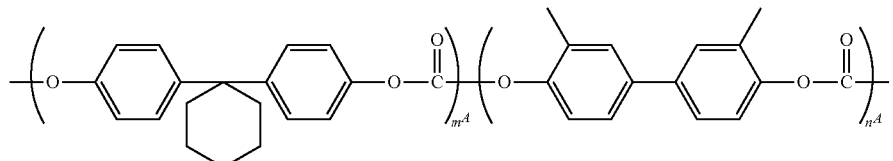
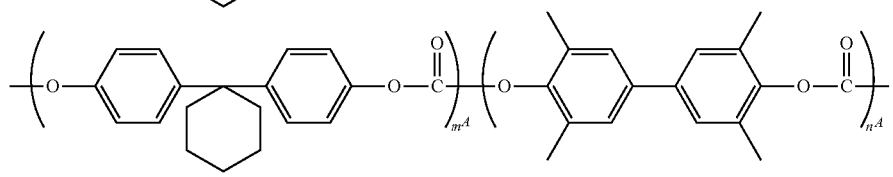
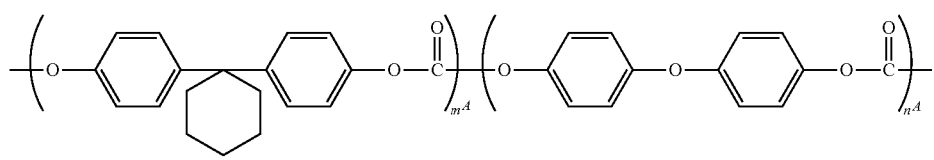
Furthermore, preferable specific examples of the polycarbonate resin (B) are shown below, but they are not particularly limitative.
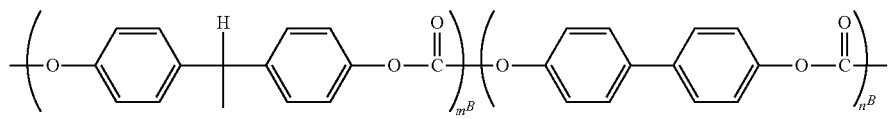

-continued

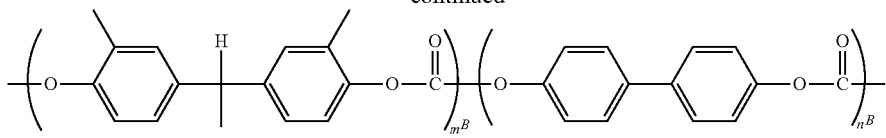

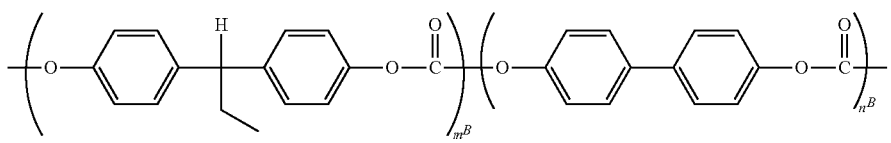

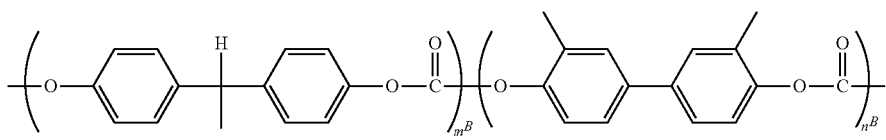

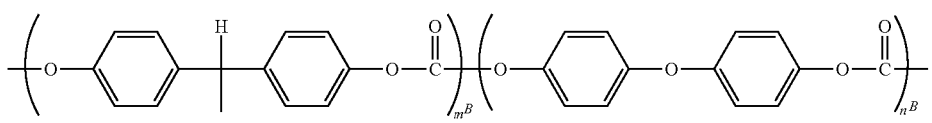

Furthermore, preferable specific examples of the polyester resin (B') are shown below, but they are not particularly limitative.

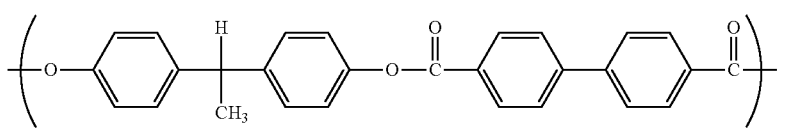

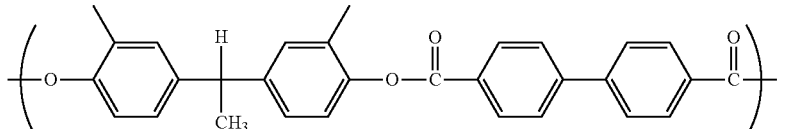

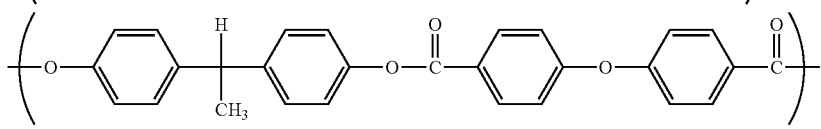

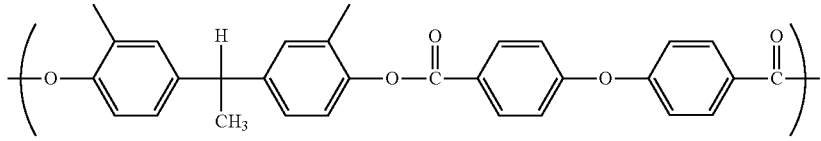

In addition, the polycarbonate resin (A), the polycarbonate resin (B), the polyester resin (B'), and a mixture thereof that are used in the present invention exhibit a reduced viscosity [$\eta_{SP}/C$] of preferably 0.1 dL/g to 5 dL/g, more preferably 0.2 dL/g to 3 dL/g, and particularly preferably 0.3 dL/g to 2.5 dL/g at 20° C. in a methylene chloride solvent solution having a concentration of 0.5 g/dL. At a reduced viscosity [$\eta_{SP}/C$] of 0.1 dL/g or more, abrasion resistance is improved when an electrophotographic photoreceptor is fabricated. At a reduced viscosity [$\eta_{SP}/C$] of 5 dL/g or less, coating viscosity does not increase too high when the photoreceptor is fabricated, whereby productivity of the electrophotographic photoreceptor is kept to be high.

The polycarbonate resins of the present invention may include therein a structural unit besides the structural unit described in formula (I) as long as the effect of the present invention is not markedly impaired, but the content (mole ratio) thereof is preferably 10 mole % or less and more preferably 5 mole % or less.

Production Method of Polycarbonate Resins

The polycarbonate resin (A) and the polycarbonate resin (B) are produced easily in accordance with a production method of conventional polycarbonate resins. Hereinafter, based on the production method of conventional polycarbonate resins, a production method of the polycarbonate resin (A) and the polycarbonate resin (B) is described.

A source material monomer (dihydric phenol) of the polycarbonate resin (A) and the polycarbonate resin (B) includes a biphenol compound and a bisphenol compound.

The biphenol compound is a monomer that serves as a source material of the structural unit on the right side of formula (I) or a source material of the structural unit on the right side of formula (IV). Specifically, examples thereof include: 4,4'-bisphenol; 3,3'-dimethyl-4,4'-biphenol; 3,3',5-trimethyl-4,4'-biphenol; 3-propyl-4,4'-biphenol; 3,3'5,5'-tetramethyl-4,4'-biphenol; 3,3'-diphenyl-4,4'-biphenol; 3,3'-dibutyl-4,4'-biphenol; and 3,3'-difluoro-4,4'-dihydroxybiphenyl. Among these, 4,4'-biphenol is preferable, considering that a less colored copolymer polycarbonate is provided. In addition, durability is also enhanced in the case of using as a copolymer polycarbonate for an electrophotographic photoreceptor. These may be used one kind solely or two or more kinds in combination.

On the other hand, the bisphenol compound is a monomer that serves as a source material of the structural unit on the left side of formula (I) or a source material of the structural unit on the right side. Furthermore, the bisphenol compound is a monomer that serves as a source material of formula (II), a source material of the structural unit on the left side of formula (IV), or a source material of the structural unit on the right side.

Examples of the bisphenol compound that serves as the source material of the structural unit on the left side of formula (I), specifically, include: 9,9-bis(3-phenyl-4-hydroxyphenyl) fluorene; bis(4-hydroxyphenyl)methane; 1,2-bis(4-hydroxyphenyl)ethane; 2,2-bis(4-hydroxyphenyl)propane; 2,2-bis(3-methyl-4-hydroxyphenyl)butane; 2,2-bis(4-hydroxyphenyl)butane; 2,2-bis(4-hydroxyphenyl)octane; 4,4-bis(4-hydroxyphenyl)heptane; 1,1-bis(4-hydroxyphenyl)-1,1-diphenylmethane; 1,1-bis(4-hydroxyphenyl)-1-phenylethane; 1,1-bis(4-hydroxyphenyl)-1-phenylmethane; bis(4-hydroxyphenyl)sulfide; bis(4-hydroxyphenyl)sulfone; 1,1-bis(4-hydroxyphenyl)cyclopentane; 1,1-bis(3-methyl-4-hydroxyphenyl)cyclopentane; 1,1-bis(4-hydroxyphenyl)cyclohexane; 2,2-bis(3-methyl-4-hydroxyphenyl)propane; 2,2-bis(3-phenyl-4-hydroxyphenyl)propane; 2,2-bis(4-hydroxyphenyl)adamantane; 2,2-bis(3-methyl-4-hydroxyphenyl)adamantane; 1,3-bis(4-hydroxyphenyl)adamantane; 1,3-bis(3-methyl-4-hydroxyphenyl)adamantane; 2-(3-methyl-4-hydroxyphenyl)-2-(4-hydroxyphenyl)-1-phenylethane; bis(3-methyl-4-hydroxyphenyl) sulfide; bis(3-methyl-4-hydroxyphenyl)sulfone; bis(3-methyl-4-hydroxyphenyl) methane; 1,1-bis(3-methyl-4-hydroxyphenyl)cyclohexane; 2,2-bis(2-methyl-4-hydroxyphenyl) propane; 1,1-bis(2-tert-buthyl-4-hydroxy-5-methylphenyl)-1-phenylmethane; bis(3-chloro-4-hydroxyphenyl)methane; bis(3,5-dibromo-4-hydroxyphenyl) methane; 2,2-bis(3-chloro-4-hydroxyphenyl)propane; 2,2-bis(3-fluoro-4-hydroxyphenyl) propane; 2,2-bis(3-bromo-4-hydroxyphenyl)propane; 2,2-bis(3,5-difluoro-4-hydroxyphenyl) propane; 2,2-bis(3,5-dichloro-4-hydroxyphenyl)propane; 2,2-bis(3,5-dibromo-4-hydroxyphenyl)propane; 2,2-bis(3-bromo-4-hydroxy-5-chlorophenyl)propane; 2,2-bis(3,5-dichloro-4-hydroxyphenyl)butane; 2,2-bis(3,5-dibromo-4-hydroxyphenyl)butane; 1-phenyl-1,1-bis(3-fluoro-4-hydroxyphenyl)ethane; 1,1-bis(3-cyclohexyl-4-hydroxyphenyl) cyclohexane; 2,2-bis(4-hydroxyphenyl) hexafluoro propane; 1,1-bis(3-phenyl-4-hydroxyphenyl) cyclohexane; bis(3-phenyl-4-hydroxyphenyl)sulfone; 4,4'-(3,3,5-trimethylcyclohexylidene)bisphenol; 4,4'-[1,4-phenylenebis(1-methylethylidene)]bisphenol; 4,4'-[1,3-phenylenebis(1-methylethylidene)]bisphenol; 9,9-bis(4-hydroxyphenyl)fluorene; and 9,9-bis(4-hydroxy-3-methylphenyl)fluorene.

Specific examples of the bisphenol compound that serves as a source material of the structural unit on the right side of formula (I) or a source material of the structural unit on the right side of formula (IV) include: bis(4-hydroxyphenyl) ether; and bis(3-fluoro-4-hydroxyphenyl)ether.

Specific examples of the bisphenol compound that serves as a monomer of formula (II) or a source material of the structural unit on the left side of formula (IV) include: 1,1-bis(3-methyl-4-hydroxyphenyl)ethane; 1,1-bis(4-hydroxyphenyl)ethane; 1,1-bis(2-butyl-4-hydroxy-5-methylphenyl)butane; 1,1-bis(2-tert-butyl-4-hydroxy-3-methylphenyl)ethane; 1,1-bis(2-tert-butyl-4-hydroxy-5-methylphenyl)propane; 1,1-bis(2-tert-butyl-4-hydroxy-5-methylphenyl)butane; 1,1-bis(2-tert-butyl-4-hydroxy-5-methylphenyl)isobutene; 1,1-bis(2-tert-butyl-4-hydroxy-5-methylphenyl)heptane; and 1,1-bis(2-tert-amyl-4-hydroxy-5-methylphenyl)butane.

These bisphenol compounds may be used one kind solely or two or more kinds in a mixture. In addition, a branched structure may be introduced by using a trihydric or more phenol.

Examples of the other monomers that may serve as the structural unit of the polycarbonate resin (A) or polycarbonate resin (B) include: 2,7-naphthalene diol; 2,6-naphthalene diol; 1,4-naphthalene diol; 1,5-naphthalene diol; phenolic hydroxyl terminated polydimethylsiloxane; α-trimethylsiloxy-ω-bis{3-(2-hydroxyphenyl)propyldimethylsiloxy}-methylsiloxy-2-dimethylsilylethyl-polydimethylsiloxane; and α,ω-bis(3-(4-hydroxy-3-methoxyphenyl)propyl)-dimethylsiloxy-polydimethylsiloxane.

In addition, at least one selected from the polycarbonate resin (A), the polycarbonate resin (B), and the polyester resin (B'), preferably the polycarbonate resin (A), may include therein to improve sliding or adhesive property, besides a structural unit derived from the aforementioned bisphenol compound, a polyalkylsiloxane structural unit that is represented by the following formula (VI) as long as the effect of the present invention is not markedly impaired.

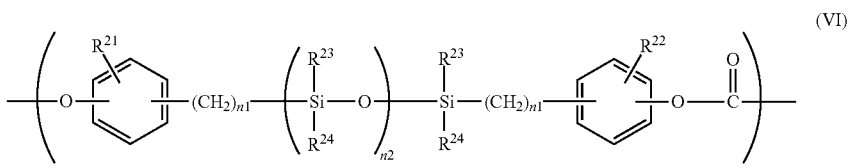

(VI)

In the formula (VI), each of $R^{21}$ and $R^{22}$ represents, independently from each other, a hydrogen atom, a halogen atom, an alkyl group having 1 to 12 carbon atoms, or a substituted or non-substituted aryl group having 6 to 12 carbon atoms. Each of $R^{23}$ and $R^{24}$ represents, independently from each other, an alkyl group having 1 to 12 carbon atoms, an alkoxy group having 1 to 12 carbon atoms, or a substituted or non-substituted aryl group having 6 to 12 carbon atoms. "n1" represents an integer of 2 to 4. "n2" represents an integer of 25 to 220.

Examples of the halogen atom that is represented by $R^{21}$ and $R^{22}$ include a fluorine atom, a chlorine atom, a bromine atom, and an iodine atom. Examples of the alkyl group having 1 to 12 carbon atoms that is represented by $R^{21}$ and $R^{22}$ include a methyl group, an ethyl group, an n-propyl group, and an isopropyl group. Examples of the aryl group that is represented by $R^{21}$ and $R^{22}$ include a phenyl group. The aryl group may have a substitution group. The substitution group includes an alkyl group having 1 to 12 carbon atoms.

The alkyl group having 1 to 12 carbon atoms that is represented by $R^{23}$ and $R^{24}$ includes the same groups as described in the case of $R^{21}$ and $R^{22}$, and preferably a methyl group. The alkyl group of the alkoxy group having 1 to 12 carbon atoms that is represented by $R^{23}$ and $R^{24}$ includes, specifically, the aforementioned alkyl group having 1 to 12 carbon atoms. Examples of the aryl group having 6 to 12 carbon atoms that is represented by $R^{23}$ and $R^{24}$ include a phenyl group. The aryl group may have a substitution group. The substitution group includes an alkyl group having 1 to 12 carbon atoms.

Polycarbonate resins (A) and (B) are easily produced by interfacial polycondensation wherein the aforementioned biphenol compound or bisphenol compound is used solely or two or more kinds in combination. Specifically, a carbonate ester bonding is formed preferably by performing interfacial polycondensation in the presence of an acid-binding agent, wherein various kinds of dihalogenated carbonyls, haloformates such as chloroformate, or carbonate ester compounds are used. Polymerization may be performed in the presence of a catalyst or a branching agent. In order to terminate the reaction, as an end stopping agent, a monofunctional phenol described below may be present therein.

Examples of the acid-binding agent include: an alkali metal hydroxide such as sodium hydroxide, potassium hydroxide, lithium hydroxide, and cesium hydroxide; an alkaline earth metal hydroxide such as magnesium hydroxide and calcium hydroxide; an alkali metal carbonate such as sodium carbonate and potassium carbonate; an organic base such as pyridine; and a mixture thereof. The ratio of using these acid-binding agents may be appropriately adjusted, considering stoichiometric ratio (equivalence) of the reaction. Specifically, the acid-binding agent may be used in an amount of preferably 1 or more equivalent and more preferably 1 to 10 equivalents with respect to one mole hydroxyl group of the source material dihydric phenol.

Examples of the branching agent include: phloroglucin; pyrogallol; 4,6-dimethyl-2,4,6-tris(4-hydroxyphenyl)-2-heptene; 2,6-dimethyl-2,4,6-tris(4-hydroxyphenyl)-3-heptene; 2,4-dimethyl-2,4,6-tris(4-hydroxyphenyl)heptane; 1,3,5-tris(2-hydroxyphenyl)benzene; 1,3,5-tris(4-hydroxyphenyl)benzene; 1,1,1-tris(4-hydroxyphenyl)ethane; tris(4-hydroxyphenyl)phenylmethane; 2,2-bis[4,4-bis(4-hydroxyphenyl)cyclohexyl]propane; 2,4-bis[2-bis(4-hydroxyphenyl)-2-propyl]phenol; 2,6-bis(2-hydroxy-5-methylbenzyl)-4-methylphenol; 2-(4-hydroxyphenyl)-2-(2,4-dihydroxyphenyl)propane; tetrakis(4-hydroxyphenyl) methane; tetrakis[4-(4-hydroxyphenyl isopropyl)phenoxy] methane; 2,4-dihydroxy benzoic acid; trimesic acid; cyanuric acid; 3,3-bis(3-methyl-4-hydroxyphenyl)-2-oxo-2,3-dihydroindole; 3,3-bis(4-hydroxyaryl)oxyindole; 5-chloroisatin; 5,7-dichloroisatin; and 5-bromoisatin.

The addition amount of these branching agents is preferably 30 mole % or less in terms of copolymerization composition ratio and more preferably 5 mole % or less. Within these ranges, moldability is not lowered.

As the end stopping agent, a monovalent carboxylic acid and the derivatives thereof, and a monohydric phenol is usable. Examples preferably used include: p-tert-butyl-phenol; p-phenylphenol; p-cumylphenol; p-perfluorononylphenol; p-(perfluorononylphenyl)phenol; p-(perfluoroxylphenyl) phenol; p-tert-perfluorobutylphenol; 1-(P-hydroxybenzyl) perfluorodecane; p-[2-(1H-1H-perfluorotridodecyloxy)-1,1,1,3,3,3-hexylfluoropropyl] phenol; 3,5-bis(perfluorohexyloxycarbonyl)phenol; p-hydroxybenzoic acid perfluorododecyl; p-(1H-1H-perfluorooctyloxy)phenol; 2H,2H,9H-perfluorononanoic acid; 1,1,1,3,3,3-tetrafluoro-2-propanol; and an alcohol that is represented by the following formulas.

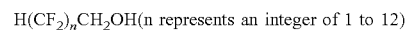

H(CF$_2$)$_n$CH$_2$OH(n represents an integer of 1 to 12)

F(CF$_2$)$_m$CH$_2$OH(m represents an integer of 1 to 12)

The addition ratio of the end-stopping agent is, in terms of copolymerization composition ratio, preferably 0.05 mole % to 30 mole % and more preferably 0.1 mole % to 10 mole %. As long as the ratio is 30 mole % or less, mechanical strength is good. When the mole ratio is 0.05 mole % or more, moldability is excellent.

The interfacial polycondensation is performed preferably in the presence of solvent. Preferable examples of the solvent include: water; an aromatic hydrocarbon such as toluene and xylene; a halogenated hydrocarbon such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, and chlorobenzene; and acetophenone. These solvents may be used one kind solely or two or more kinds in combination. Furthermore, the interfacial polycondensation may be performed by using two kinds of solvents which are immiscible with each other (for example, water and methylene chloride and others).

Preferable examples of the catalyst include: a tertiary amine such as trimethylamine, triethylamine, tributylamine, N,N-dimethylcyclohexyl amine, pyridine, and dimethylaniline; a quaternary ammonium salt such as trimethylbenzylammonium chloride, triethylbenzylammonium chloride, tributylbenzylammonium chloride, trioctylmethylammonium chloride, tetrabutylammonium chloride, and tetrabutylammonium bromide; and a quaternary phosphonium salt such as tetrabutylphosphonium chloride and tetrabutylphosphonium bromide.

Furthermore, if necessary, an antioxidant such as sodium sulfite and hydrosulfite salt may be added to this reaction system in a small amount.

In this reaction, the dihydric phenol is added preferably in the form of an organic solvent solution and/or an alkaline aqueous solution. The addition order thereof is not particularly limitative. Note that, the catalyst, the branching agent, the end-stopping agent, and others may be added either or both in the production step of polycarbonate oligomers and/or in a subsequent polymerization step.

The polycarbonate resin that is obtained in this way is, preferably, a polymer whose at least one terminal of the chain has a terminal structure that is derived from the aforementioned end-stopping agent.

The polycarbonate resin may include therein, within a range where the object of the present invention is not impaired, a polycarbonate unit that has a structural unit other than formula (I) or a unit having a polyester, polyurethane, or polyether structure. These units are preferably 20 mole % or less with respect to the total structural units and more preferably 10 mole % or less.

Note that, the reduced viscosity [$\eta_{SP}$/C] (a value having correlation with viscosity averaged molecular weight) of the polycarbonate resins (A) and (B) or a mixture thereof may be limited within the aforementioned range by various methods including, for example, selection of the aforementioned reaction conditions or adjustment of used amount of the branching agent or molecular weight modifier. In addition, depending on situations, a resulting polycarbonate resin is appropriately subjected to a physical treatment (including mixing and fractionation) and/or a chemical treatment (including polymer reaction, cross-linking treatment, and partial decomposition treatment), so that a polycarbonate resin having a given reduced viscosity [$\eta_{SP}$/C] is obtainable.

Furthermore, a resulting reaction product (a crude product) is subjected to known various post-treatments including separation and refinement, so that a polycarbonate resin having a desired purity (purification degree) may be recovered.

Production Method of Polyester Resin (B')

The production method of the polyester resin (B') is not particularly limited. Conventional production methods of polyester resin are usable. Specifically, a bisphenol compound that is represented by the following formula (II) is used as a polyol constituent or a part of a polyol constituent.

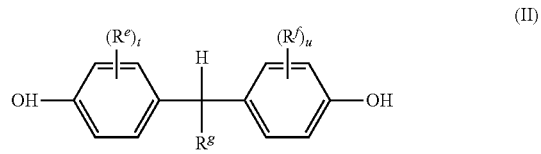

(II)

(In the formula, $R^e$, $R^f$, $R^g$, t, and u are the same as defined above.)

The bisphenol compound is subjected to polycondensation along with a carboxylic acid constituent, so that the polyester resin (B') is produced. As an illustrative embodiment, known polymerization methods including interfacial polymerization, melt polymerization, and solution polymerization are usable.

In the case of interfacial polymerization, a solution that dissolves a polyol constituent such as a bisphenol compound in an alkaline aqueous solution of sodium hydroxide or potassium hydroxide is mixed with a solution that dissolves an aromatic dicarboxylic acid chloride in a halogenated hydrocarbon. As a catalyst at this time, a quaternary ammonium salt or a quaternary phosphonium salt may be used. Polymerization temperature is preferably 0° C. to 40° C. Polymerization time is preferably 1 hour to 12 hours. After polymerization, a water phase and an organic phase are separated from each other. A polymer that is dissolved in the organic phase is washed and recovered by known methods, so that the polyester resin (B') is obtained.

A solvent usable on this occasion includes: a halogenated hydrocarbon such as dichloromethane, chloroform, and dichlorobenzene; and an aromatic hydrocarbon such as toluene.

Examples of the quaternary ammonium salt or the quaternary phosphonium salt that is used as a catalyst include: a salt of a tertiary alkyl amine such as tributyl amine and trioctyl amine and a hydrochloric acid, bromic acid, iodic acid, and others; benzyltriethyl ammonium chloride; benzyltrimethyl ammonium chloride; benzyltributyl ammonium chloride; tetraethyl ammonium chloride; tetrabutyl ammonium chloride; tetrabutyl ammonium bromide; trioctylmethyl ammonium chloride; tetrabutyl phosphonium bromide; triethyloctadecyl phosphonium bromide; N-lauryl pyridinium chloride; and lauryl picolinium chloride.

In addition, for the polymerization, a molecular weight modifier may be used. Examples of the molecular weight modifier include: phenol; o, m, or p-cresol; alkylphenols such as o, m, p-ethylphenol, o, m, or p-propylphenol, o, m, or p-tert-butylphenol, pentylphenol, hexylphenol, ocrylphenol, nonylphenol, and a 2,6-dimethylphenol derivative; perfluoroalkylphenols or alkylphenols partly substituted by fluorine; perfluoroalcohols or alcohols partly substituted by fluorine; a monofunctional phenol such as o, m, or p-phenylphenol; and a monofunctional acid halide such as acetic acid chloride, lactic acid chloride, octylic acid chloride, benzoyl chloride, benzenesulfonyl chloride, benzenesulfinyl chloride, sulfinyl chloride, benzenephosphonyl chloride, and a substitution product thereof.

Electrophotographic Photoreceptor

In the electrophotographic photoreceptor of the present invention, the content ratio of the polycarbonate resin (A) with respect to the total amount of the polycarbonate resin (A), the polycarbonate resin (B), and the polyester resin (B'), that is (A)/((A)+(B)+(B')), is preferably 0.5 to 0.99 by mass ratio, more preferably 0.7 to 0.95, and still more preferably 0.75 to 0.95, considering that abrasion resistance is improved and an adverse effect to electrophotographic properties caused by crystallization and other is reduced.

The electrophotographic photoreceptor of the present invention is not particularly limited as long as at least one selected from the polycarbonate resin (B) and the polyester resin (B') is included therein along with the polycarbonate resin (A) (hereinafter, called as "polycarbonate resin mixture"). The electrophotographic photoreceptor may be formed in various kinds of known configurations. For example, an electrophotographic photoreceptor has a photoreceptor layer on an electrical conductive substrate. If necessary, an underlying layer or a blocking layer that serves a charge blocking function may be included between the electroconductive substrate and the photoreceptor layer. If necessary, an electrical conductive or insulating protective layer may be disposed on the photoreceptor layer. An adhesive layer may be disposed in each interlayer.

In particular, an electrophotographic photoreceptor that has a photoreceptor layer having at least one charge generating layer and at least one charge transporting layer, or an electrophotographic photoreceptor that has a photoreceptor layer that is composed of a single layer and contains a charge generating material and a charge transporting material is preferable. Note that, when the photoreceptor layer has two layers of a charge generating layer and a charge transporting layer, the charge transporting layer may be laminated on the charge generating layer, or the charge generating layer may be laminated on the charge transporting layer.

The polycarbonate resin mixture may be used in any portion of the electrophotographic photoreceptor. However, in order to exert a sufficient effect of the present invention, desirably, the mixture is used as (1) a binder resin of a charge transporting material in a charge transporting layer, (2) a binder resin for the photoreceptor layer that is composed of a single layer, or (3) a resin for a surface protection layer, for example. The polycarbonate resin mixture may be used for any one of applications (1) to (3) or for two or more applications. Note that, in the case of a multi-layer electrophotographic photoreceptor that has two charge transporting layers, the polycarbonate resin mixture is used as a binder resin preferably for at least one charge transporting layer.

When the polycarbonate resin mixture is used for the electrophotographic photoreceptor, if necessary, the polycarbonate resin mixture may be mixed with the other resin different from the polycarbonate resins (A) and (B) and the polyester resin (B'). In this case, the content ratio of the polycarbonate resin mixture with respect to the total resins is preferably 20 mass % or more, more preferably 50 mass % or more, still more preferably 80 mass % or more, still more preferably 90 mass % or more, and particularly preferably substantially 100 mass %.

In addition, the polycarbonate resin mixture may be mixed with an additive such as an antioxidant.

Electroconductive Substrate

As a material of the electroconductive substrate, known ones are usable. Specifically, examples of the material include: a plate, a drum, or a sheet that is made of aluminum, nickel, chromium, palladium, titanium, molybdenum, indium, gold, platinum, silver, copper, zinc, brass, stainless steel, lead oxide, tin oxide, indium oxide, ITO (indium tin oxide: tin doped indium oxide), or graphite; a film, sheet, or seamless belt of glass, cloth, paper, or plastics that has been subjected to a conductive treatment by coating or the like including vacuum deposition, sputtering, and embrocation; and a metal drum that has been subjected to a metal oxidation treatment including electrode oxidation.

Charge Generating Layer

The charge generating layer has at least a charge generating material. The charge generating layer is obtained by forming a layer of the charge generating material on a underlying electroconductive substrate or the other layer through vacuum deposition, sputtering, and the like, or by forming a layer in which the charge generating material is bonded together with a binder resin on the underlying electroconductive substrate or the other layer.

In the latter case, the content ratio of the charge generating material and the binder resin (charge generating material: binder resin) in the charge generating layer is not particularly limited, but preferably 20:80 to 80:20 by mass ratio more preferably 30:70 to 70:30. The binder resin may include therein the polycarbonate resin mixture, or the whole body thereof may be composed of the polycarbonate resin mixture.

As a method of forming the charge generating layer that uses the binder resin, known methods are usable. Generally, for example, in a preferable method, a coating liquid in which the charge generating material is dispersed or dissolved along with the binder resin in an appropriate solvent is coated on an underlying electroconductive substrate or the other layers and dried to obtain a wet-process molding.

Examples of the solvent that is used to prepare the coating liquid include: an aromatic solvent such as benzene, toluene, xylene, and chlorobenzene; a ketone such as acetone, methylethylketone, and cyclohexanone; an alcohol such as methanol, ethanol, and isopropanol; an ester such as ethyl acetate and ethyl cellosolve; a halogenated hydrocarbon such as carbon tetrachloride, carbon tetrabromide, chloroform, dichloromethane, and tetrachloroethane; an ether such as tetrahydrofuran, dioxolan, and dioxane; dimethylformamide; dimethylsulfoxide; and dimethylformamide. These solvent may be used one kind solely or two or more kinds in a mixture. The solid content concentration of the coating liquid that is used to form the charge generating layer is preferably 0.1 mass % to 30 mass % and more preferably 0.1 mass % to 20 mass %.

The thickness of the charge generating layer is, generally, preferably 0.01 µm to 2 µm and more preferably 0.1 µm to 0.8 µm. When the thickness of the charge generating layer is 0.01 µm or more, the layer is easily formed in a uniform thickness. In the case of 2 µm or less, lowering in electrophotographic properties is avoided.

As the charge generating material, various kinds of known ones are usable. Specific examples thereof include: elemental selenium such as amorphous selenium and trigonal selenium; a selenium alloy such as selenium—tellurium; a selenium compound or a selenium containing composition such as $As_2Se_3$; an inorganic material of Groups 12 and 16 elements of the periodic system such as zinc oxide and CdS—Se; an oxide semiconductor such as titanium oxide; a silicon material such as amorphous silicon; a metal free phthalocyanine pigment such as a τ-type metal free phthalocyanine and a χ-type metal free phthalocyanine; a metal phthalocyanine pigment such as an α-type copper phthalocyanine, a β-type copper phthalocyanine, a γ-type copper phthalocyanine, an ε-type copper phthalocyanine, an X-type copper phthalocyanine, an A-type titanyl phthalocyanine, a B-type titanyl phthalocyanine, a C-type titanyl phthalocyanine, a D-type titanyl phthalocyanine, an E-type titanyl phthalocyanine, an F-type titanyl phthalocyanine, a G-type titanyl phthalocyanine, an H-type titanyl phthalocyanine, a K-type titanyl phthalocyanine, an L-type titanyl phthalocyanine, an M-type titanyl phthalocyanine, an N-type titanyl phthalocyanine, an Y-type titanyl phthalocyanine, an oxotitanyl phthalocyanine, a titanyl phthalocyanine that exhibits a strong diffraction peak at a Bragg angle 2θ of 27.3±0.2 degree in a X-ray diffraction pattern, and a gallium phthalocyanine; a cyanine dye; an anthracene pigment; a bis-azo pigment; a pyrene pigment; a polycyclic quinone pigment; a quinacridone pigment; an indigo pigment; a perylene pigment; a pyrylium dye; a squarylium pigment; an anthoanthorone pigment; a benzimidazole pigment; an azo pigment; a thioindigo pigment; a quinoline pigment; a lake pigment; an oxazine pigment; a dioxazine pigment; a triphenylmethane pigment; an azulenium dye; a triarylmethane dye; a xanthine dye; a thiazine dye; a thiapyrylium dye; polyvinyl carbazole; and a bis-benzimidazole pigment. These may be used one kind solely or two or more kinds in combination. Among these charge generating materials, a charge generating material that is represented by any one of the following formulas (i) to (iii) is preferable.

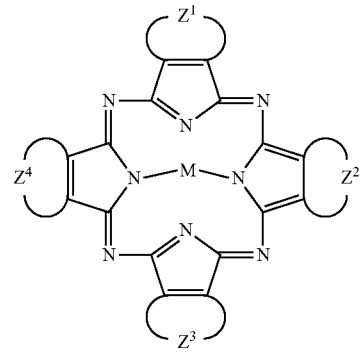

(i)

In the formula, each of $Z^1$ to $Z^4$ represents, independently from one another, an atomic group that is capable of forming, along with two carbon atoms on the pyrrole ring, a substituted or non-substituted aromatic hydrocarbon ring or a substituted or non-substituted heterocyclic ring; and M represents a metal atom or a metal compound that may have two hydrogen atoms or ligands.

$$Ar^1\text{-}(N=N\text{-}Cp)_t \qquad (ii)$$

In the formula, $Ar^1$ represents a t-valent residue having a conjugated system that may include an aromatic hydrocarbon ring or a heterocyclic ring; "t" represents a positive number of 1 or more; Cp represent a coupler residue that has an aromatic hydroxyl group; and when "t" is 2 or more, each of Cp's may be the same or different.

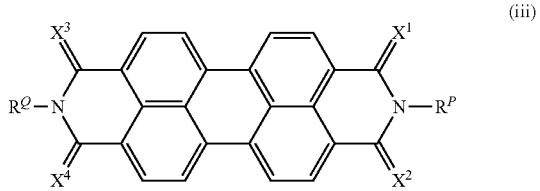

(iii)

In the formula, each of $X^1$ to $X^4$ represents, independently from one another, an oxygen atom, a sulfur atom, and a selenium atom; each of $R^P$ and $R^Q$ represents an alkyl or aryl group having 1 to 12 carbon atoms; and a substituted or non-substituted heterocyclic ring may be formed by $X^1$ or $X^2$ along with $R^P$, and $X^3$ or $X^4$ along with $R^Q$.

The binder resin that is used for the charge generating layer is not particularly limited, but various kinds of known ones are usable. Specifically, examples thereof include: polystyrene; polyvinyl chloride; polyvinyl acetate; a copolymer of vinyl chloride and vinylacetate; polyvinyl acetal; alkyd resin; acrylic resin; polyacrylonitrile; polycarbonate; polyurethane; epoxy resin; phenol resin; polyamide; polyketone; polyacrylamide; butyral resin; polyester resin; a copolymer of vinylidene chloride and vinyl chloride; methacrylic resin; a copolymer of styrene and butadiene; a copolymer of vinylidene chloride and acrylonitrile; a copolymer of vinyl chloride, vinyl acetate, and maleic anhydride; silicone resin; silicone-alkyd resin; phenol-formaldehyde resin; styrene-alkyd resin; melamine resin; polyether resin; benzoguanamine resin; epoxy acrylate resin; urethane acrylate resin; poly-N-vinylcarbazole; polyvinyl butyral; polyvinyl formal; polysulfone; casein; gelatin; polyvinyl alcohol; ethylcellulose; nitrocellulose; carboxy-methylcellulose; polymer latex of vinylidene chloride; a copolymer of acrylonitrile and butadiene; a copolymer of vinyl toluene and styrene; soy bean oil modified alkyd resin; nitrated polystyrene; polymethyl styrene; polyisoprene; polythiocarbonate; polyallylate; polyhaloallylate; polyallylether; polyvinyl acrylate; and polyester acrylate. These may be used one kind solely or two or more kinds in a mixture.

As the binder resin, the aforementioned carbonate resin mixture may be used solely or in combination with the binder resin.

Charge Transporting Layer

The charge transporting layer is obtainable as a wet-process molding by forming, on an underlying electroconductive substrate or the other layer, a layer in which the charge transporting material is stuck together with the binder resin.

As a method of forming the charge transporting layer, various kinds of known methods are usable. For example, in a preferable method, a coating liquid, in which the charge transporting material is dispersed or dissolved in an appropriate solvent along with the polycarbonate resin mixture, is coated on a predetermined underlying electroconductive substrate or the other layer, and then dried to obtain the wet-process molding.

The content ratio of the charge transporting material and the binder resin in the charge transporting layer (charge transporting material:binder resin) is, in terms of mass ratio, preferably 10:90 to 80:20, more preferably 20:80 to 80:20, more preferably 20:70 to 70:20, and still more preferably 20:50 to 80:50. Note that, the binder resin may include therein the polycarbonate resin mixture, or the whole body thereof may be the polycarbonate resin mixture.

Examples of the solvent that is used in the preparation of the coating liquid include the same solvents that are used in the case of forming the charge generating layer. Among these, ether is preferable, and tetrahydrofuran is more preferable. The solid content concentration of the coating liquid that is used to form the charge transporting layer is preferably 0.1 mass % to 30 mass % and more preferably 0.1 mass % to 20 mass %.

The thickness of the charge transporting layer is, generally, preferably around 5 μm to around 100 μm and more preferably 10 μm to 30 μm. When the thickness of the charge transporting layer is 5 μm or more, lowering in the initial potential is avoided. When 100 μm or less, good electrophotographic properties are attained.

As the charge transporting material, various kinds of known compounds are usable. Examples of these compounds preferably include: a carbazole compound; an indole compound; an imidazole compound; an oxazole compound; a pyrazole compound; an oxadiazole compound; a pyrazoline compound; a thiadiazole compound; an aniline compound; a hydrazone compound; an aromatic amine compound; an aliphatic amine compound; a stilbene compound; a fluorenone compound; a butadiene compound; an enamine-based compound; a quinone compound; a quinodimethane compound; a thiazole compound; a triazole compound; an imidazolone compound; an imidazolidine compound; a bis-imidazolidine compound; an oxazolone compound; a benzothiazole compound; a benzimidazole compound; a quinazoline compound; a benzofuran compound; an acridine compound; a phenazine compound; poly-N-vinyl carbazole; polyvinyl pyrene; polyvinyl anthracene; polyvinyl acridine; poly-9-vinylphenyl anthracene; pyrene-formaldehyde resin; ethyl carbazole resin; and a polymer that has these structures in the principle chain or side chain thereof. These compounds may be used one kind solely or two or more kinds in combination.

Among these charge transporting materials, the compounds that are exemplified in the paragraph numbers of [0121] to [0166] in Japanese Patent Laid-Open Publication No. H11-172003, and a charge transporting material that is represented by the following structures are preferable.

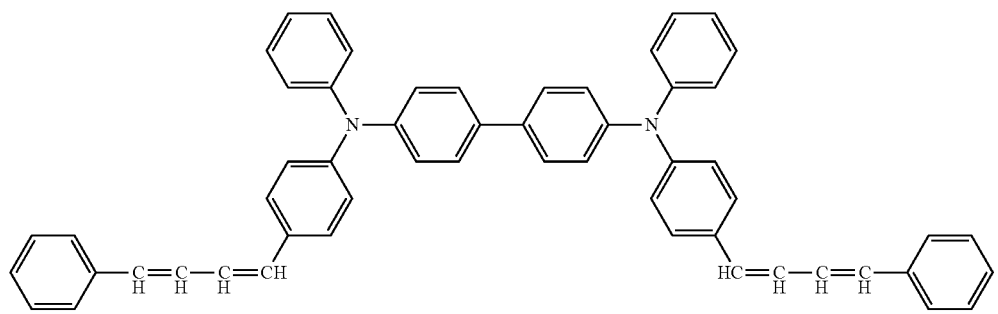

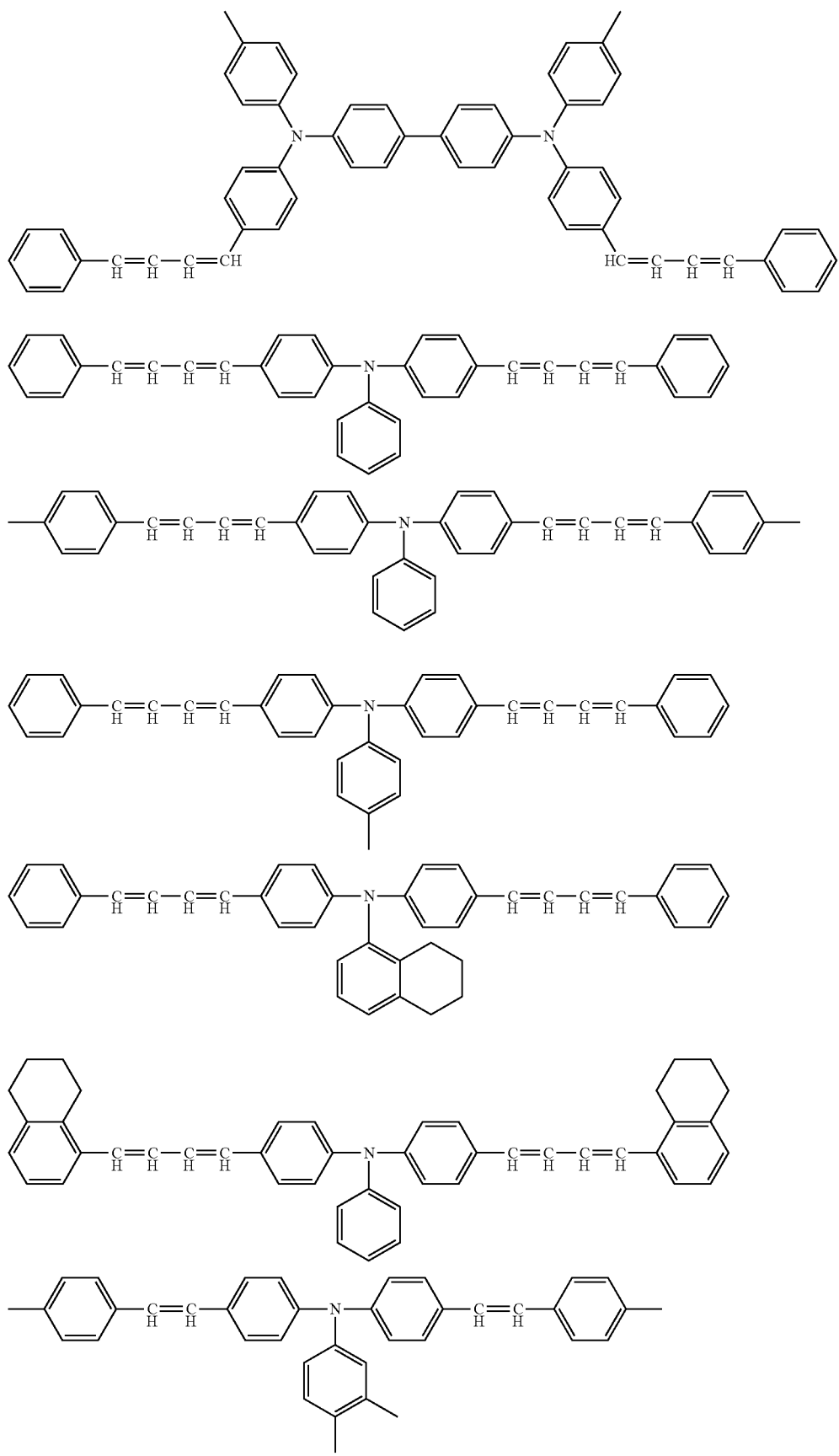

-continued
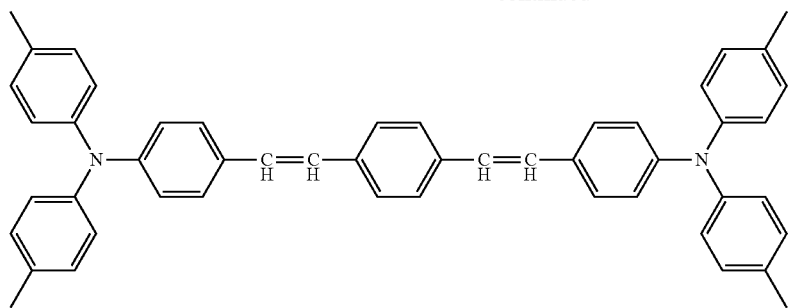
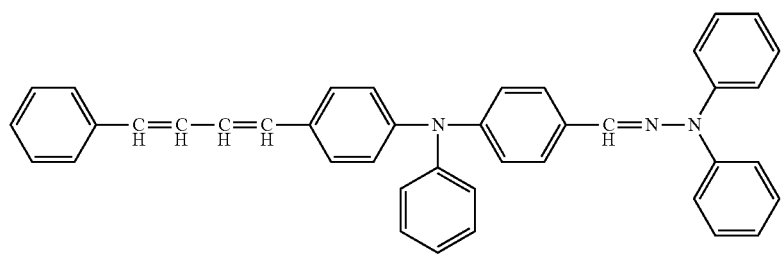
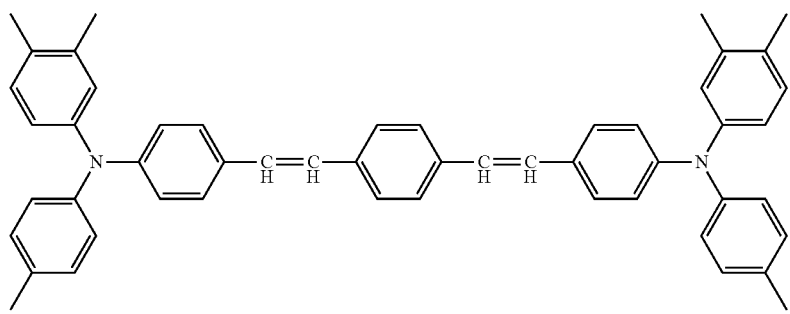
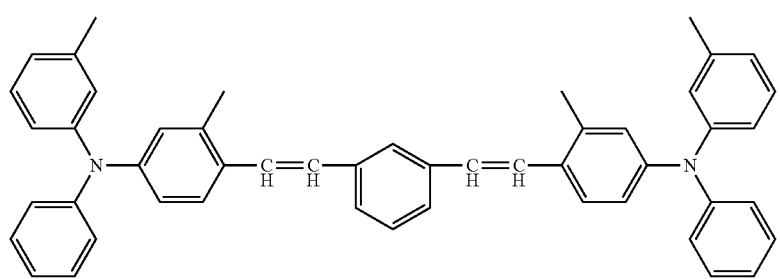
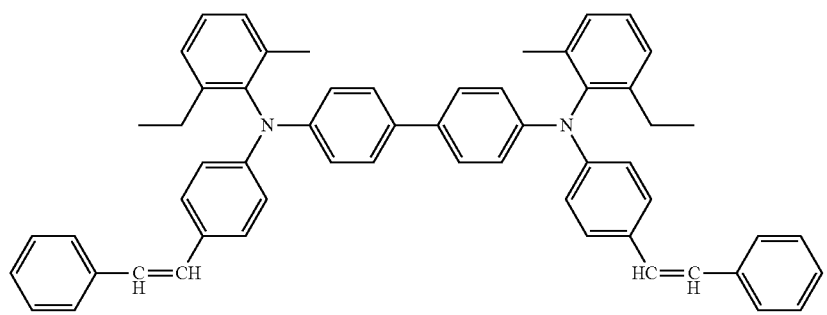

-continued
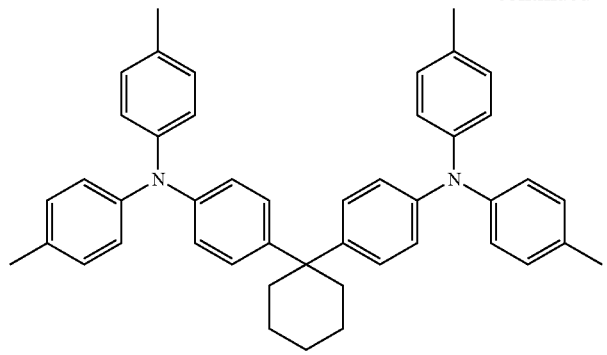
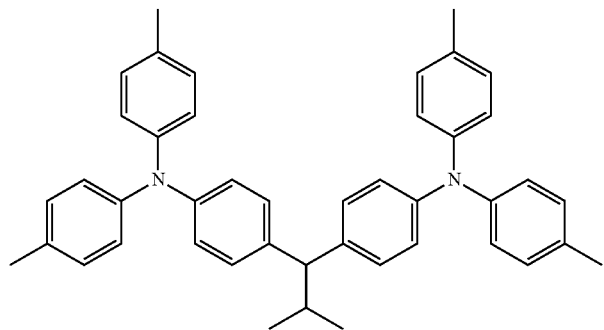
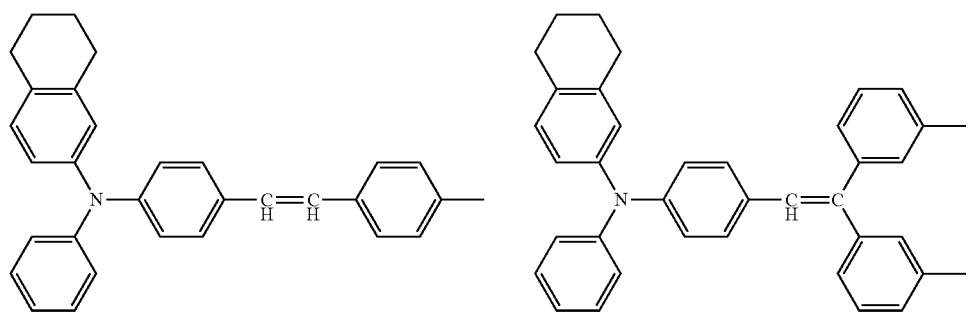
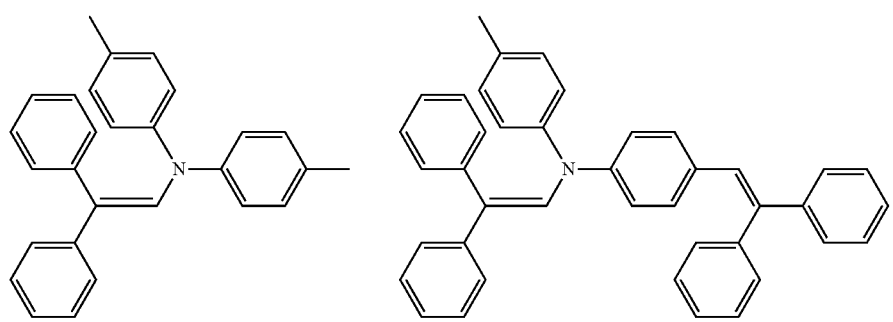
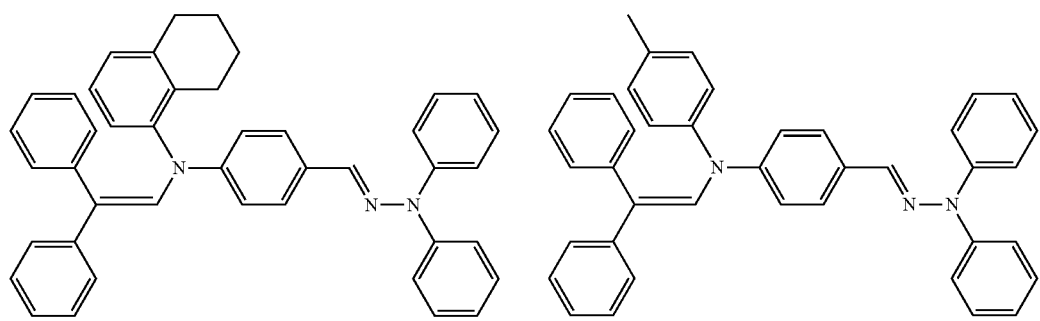

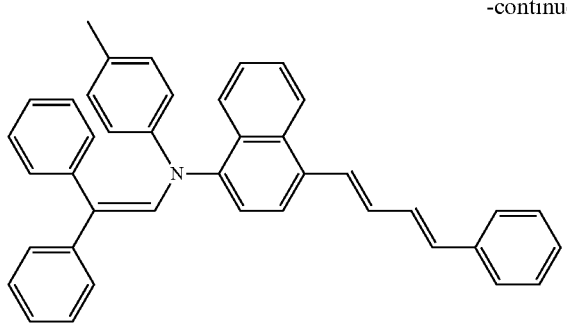
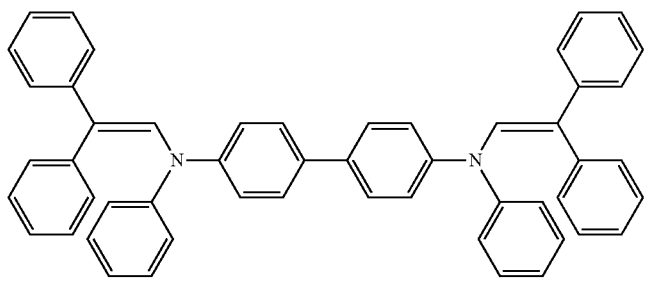
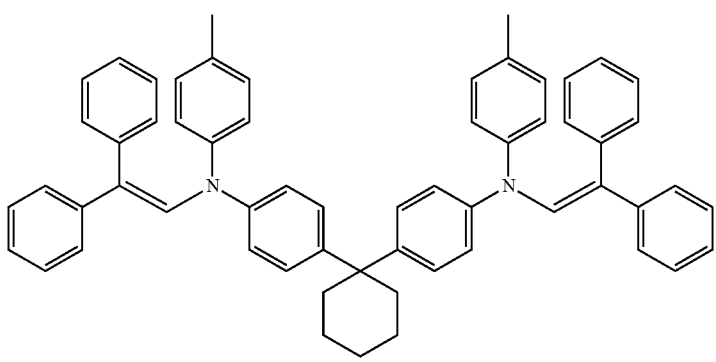
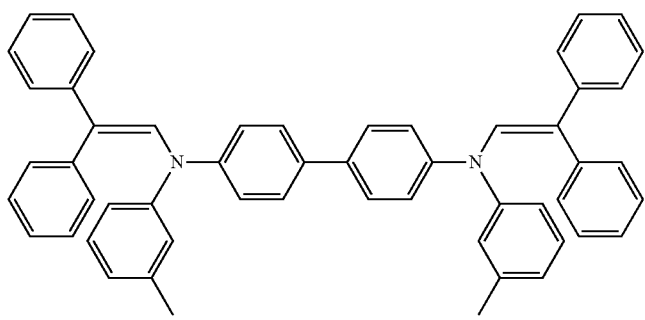
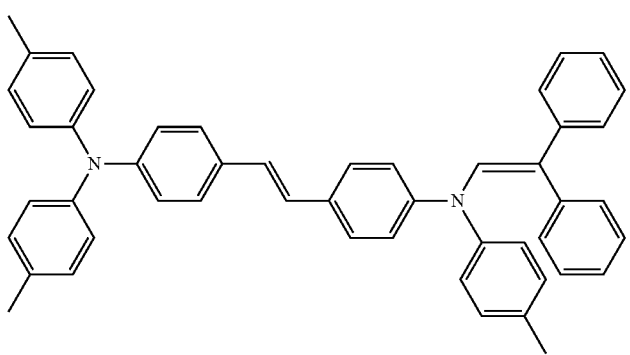

-continued
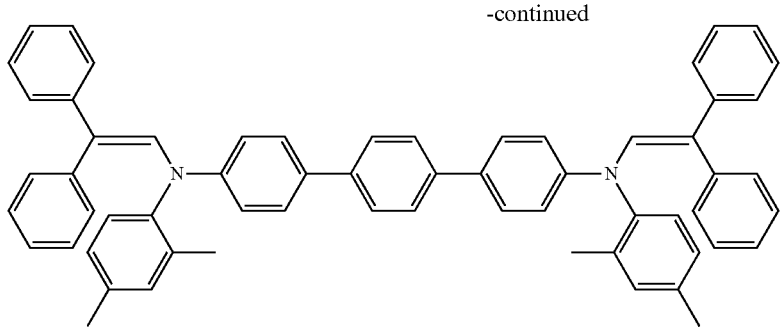
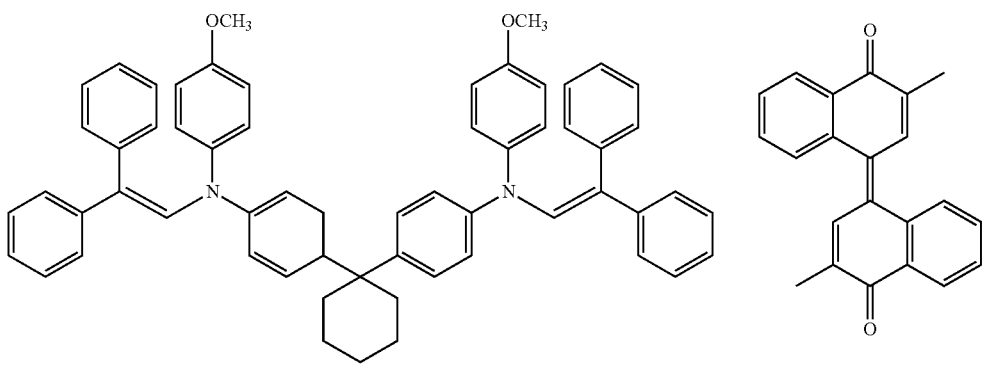
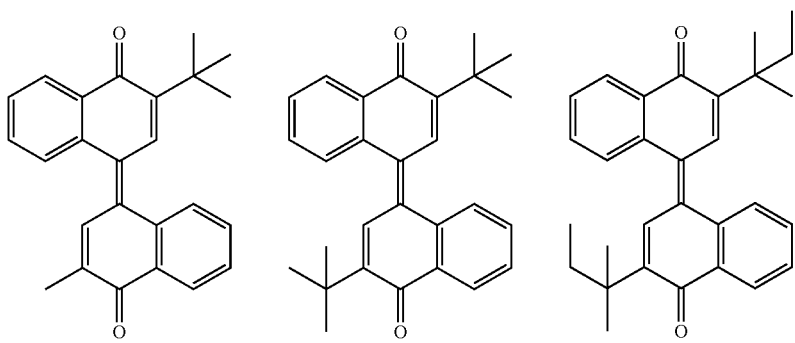
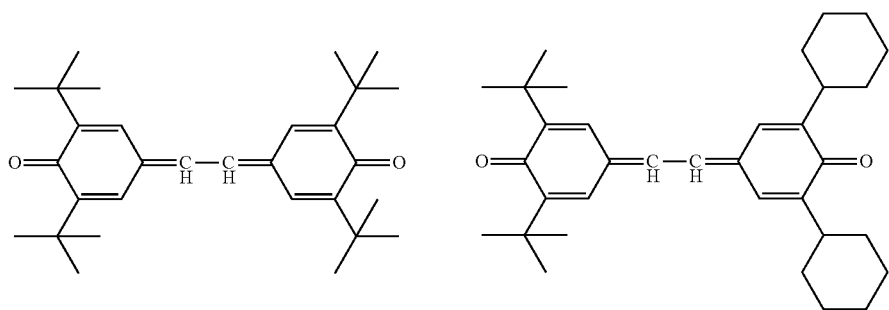
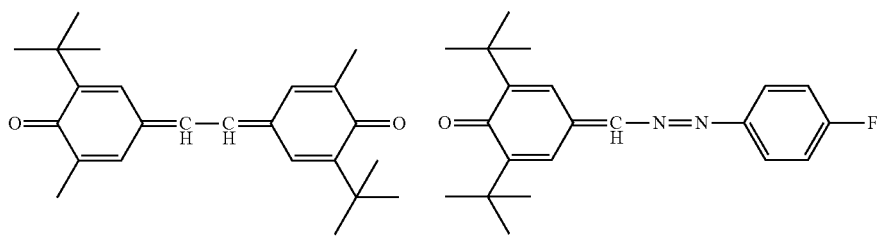

-continued
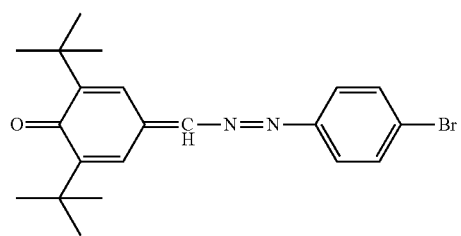
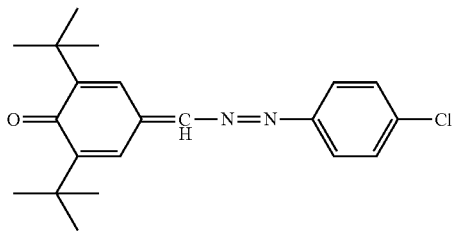
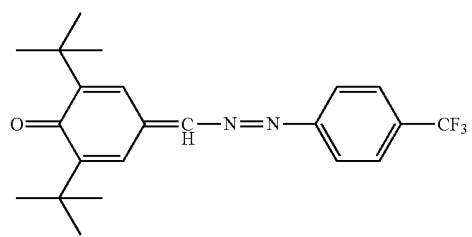
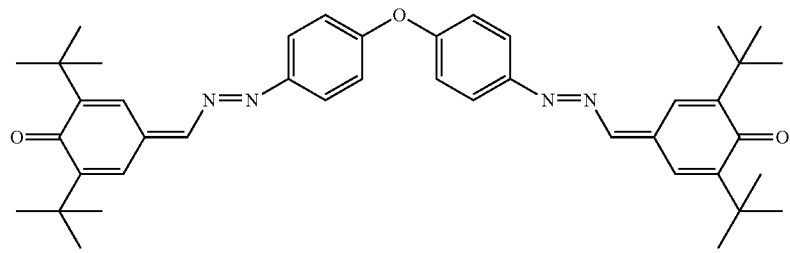
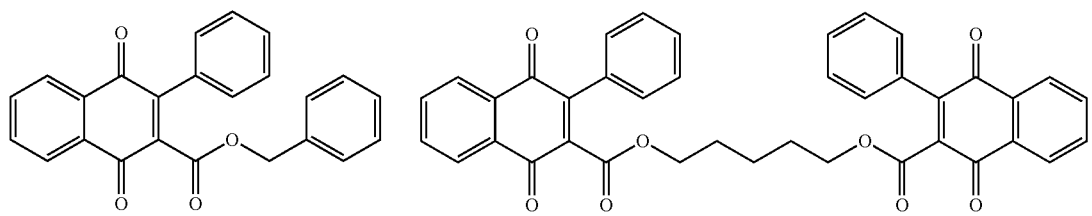
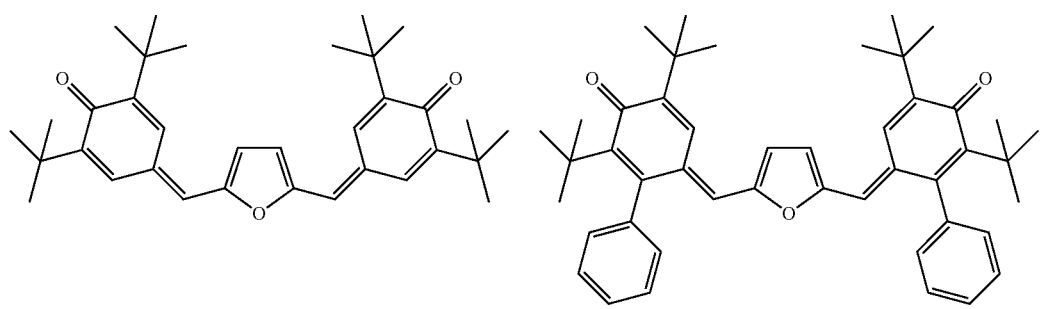
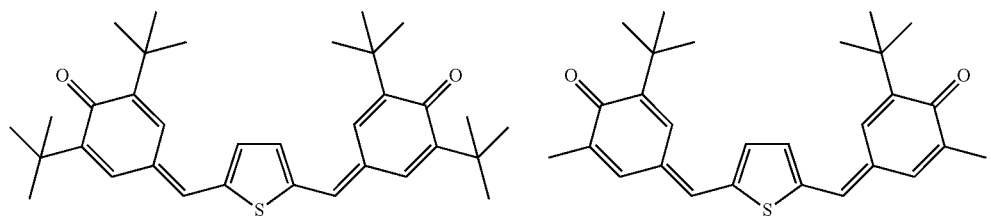
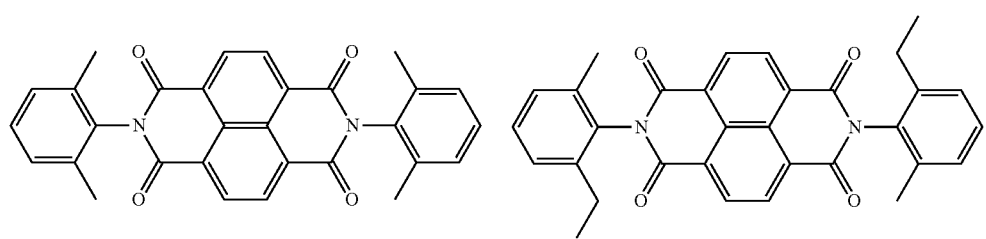

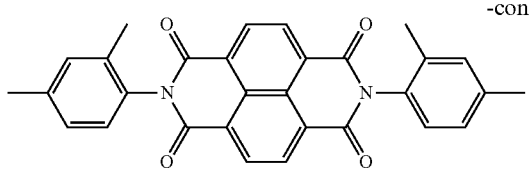
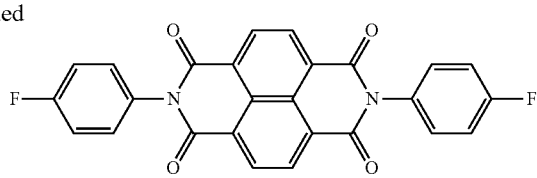

The binder resin of the charge transporting layer is not particularly limited. Besides the polycarbonate resin mixture, known binder resins are usable. The known binder resins include the same ones as described in the case of the charge generating layer. The binder resins may be used one kind solely or two or more kinds in a mixture.

In particular, as the binder resin of the charge transporting layer, the polycarbonate resin mixture is preferably used. When the polycarbonate resin mixture is used as the binder resin of the charge transporting layer, the polycarbonate resin mixture may be solely used as the binder resin, or may be mixed with the other binder resin. The content ratio of the polycarbonate resin mixture with respect to the whole binder resin is preferably 20 mass % or more, more preferably 50 mass % or more, more preferably 80 mass % or more, still more preferably 90 mass % or more, and particularly preferably substantially 100 mass %.

Note that, in the electrophotographic photoreceptor of the present invention, the polycarbonate resin mixture is preferably used as the binder resin in at least one of the charge generating layer and the charge transporting layer.

Underlying Layer

In the electrophotographic photoreceptor of the present invention, between the electroconductive substrate and the photoreceptor layer, an underlying layer that is conventionally used may be disposed. Examples of the material that is usable for the underlying layer include: fine particles of titanium oxide, aluminum oxide, zirconia, titanic acid, zirconic acid, lanthanum lead, titanium black, silica, lead titanate, barium titanate, tin oxide, indium oxide, silicon oxide, and the like; polyamide resin; phenol resin; casein; melamine resin; benzoguanamine resin; polyurethane resin; epoxy resin; cellulose; nitrocellulose; polyvinylalcohol; and polyvinyl butyral resin. As a resin that is used for the underlying layer, the binder resin that is usable for the charge generating layer or the charge transporting layer may be used. The polycarbonate resin mixture may be also used. These fine particles and resins may be used one kind solely or two or more kinds in a mixture. In the case of using a mixture of two or more kinds, preferably the inorganic fine particles and the resins are used together, because a skin film excellent in smoothness is formed.

In the case of having the underlying layer, the thickness of the underlying layer is preferably 0.01 µm to 15 µm and more preferably 0.1 µm to 7 µm. When the thickness of the underlying layer is 0.01 µm or more, the underlying layer is easily uniformly formed. When 15 µm or less, good electrophotographic properties are attained.

Blocking Layer

Between the electroconductive substrate and the photoreceptor layer, a known blocking layer that is conventionally used may be disposed. As the binder resin used for the blocking layer, the binder resin that arc usable for the charge generating layer and the charge transporting layer may be used, or the polycarbonate resin mixture may be used.

In the case of having the blocking layer, the thickness of the blocking layer is preferably 0.01 µm to 20 µm and more preferably 0.1 µm to 10 µm. When the thickness of the blocking layer is 0.01 µm or more, the blocking layer is easily uniformly formed. When 20 µm or less, good electrophotographic properties are attained.

Protection Layer

In addition, the electrophotographic photoreceptor of the present invention may have a protection layer on the photoreceptor layer. For the protection layer, the binder resin that is usable for the charge generating layer or the charge transporting layer may be used, or the polycarbonate resin mixture may be used.

In the case of having the protection layer on the photoreceptor layer, the thickness of the protection layer is preferably 0.01 µm to 20 µm and more preferably 0.1 µm to 10 µm. The protection layer may include therein an electroconductive material such as the charge generating material, the charge transporting material, additives, metal or the oxides, nitrides, or salts thereof, alloys, carbon black, and an organic electroconductive compound, or a lubricity imparting material such as fluoro resin including Teflon (trade name) or silicone resin.

Various Kinds of Additives

In addition, in order to improve the performance of the electrophotographic photoreceptor, a binder, a plasticizer, a curing catalyst, a fluidity imparting agent, a pinhole conditioner, and a spectral sensitivity sensitizer (sensitizing dye) may be added to the photoreceptor layer. Furthermore, in order to prevent increase in residual potential, lowering in charging potential, and lowering in sensitivity upon repeated use, various kinds of chemical materials, for example, additives such as an antioxidant, a surfactant, a curing inhibitor, and a leveling agent, may be added.

Examples of the binder include: silicone resin; polyamide resin; polyurethane resin; polyester resin; epoxy resin; polyketone resin; polycarbonate resin; polystyrene resin; polymethacrylate resin; polyacrylamide resin; polybutadiene resin; polyisoprene resin; melamine resin; benzoguanamine resin; polychloroprene resin; polyacrylonitrile resin; ethylcellulose resin; nitrocellulose resin; urea resin; phenol resin; phenoxy resin; polyvinylbutyral resin; formal resin; vinylacetate resin; a copolymer of vinylacetate and vinylchloride; and polyester carbonate resin. In addition, a thermosetting resin and/or a light curing resin are also usable. In any way, the resin is electrical insulating and capable of forming a film under normal conditions, and as long as the effect of the present invention is not impaired, there are not particular limitations.

Specific examples of the plasticizer include: biphenyl; biphenyl chloride; o-terphenyl; halogenated paraffin; dimethyl naphthalene; dimethyl phthalate; dibutyl phthalate; dimlyl phthalate; diethyleneglycol phthalate; triphenyl phthalate; diisobutyl adipate; dimethyl sebacate; dibutyl sebacate; butyl laurate; methylphthalyl ethylglycolate; dimethylglycol phthalate; methyl naphthalene; benzophenone; polypropylene; polystyrene; and a fluoro-hydrocarbon;

Specific examples of the curing catalyst include: methane sulfonic acid; dodecylbenzene sulfonic acid; and dinonylnaphthalene sulfonic acid. Examples of the fluidity imparting agent include: Modaflow and Acronal 4F. Examples of the pinhole conditioner include: benzoin and dimethyl phthalate.

Each of the plasticizer, curing catalyst, fluidity imparting agent, and pinhole conditioner is used in an amount of preferably 5 parts by mass or less with respect to 100 parts by mass of the charge transporting material.

Furthermore, suitable examples of the spectral sensitivity sensitizer include, in the case of using the sensitizing dye, a triphenylmethane dye such as Methyl Violet, Crystal Violet, Night Blue, and Victoria Blue; an acridine dye such as Erythrocin, Rhodamine B, Rhodamine 3R, Acridine Orange, and Flapeocin; a thiazine dye such as Methylene Blue and Methylene Green; an oxazine dye such as Capri Blue and Meldola's Blue; a cyanine dye; a merocyanine dye; a styryl dye; a pyrylium salt dye; and a thiopyrylium salt dye.

In the photoreceptor layer, an electron accepting material may be added for the purpose of sensitivity enhancement, reduction of residual potential, reduction of fatigue upon repeated use, and others. Specific preferable examples of the electron accepting material include: succinic anhydride; malic anhydride; dibromomaleic anhydride; phthalic anhydride; tetrachlorophthalic anhydride; tetrabromophthalic anhydride; 3-nitrophthalic anhydride; 4-nitrophthalic anhydride; pyromellitic anhydride; mellitic anhydride; tetracyano ethylene; tetracyano quinodimethane; o-dinitrobenzene; m-dinitrobenzene; 1,3,5-trinitrobenzene; p-nitrobenzonitrile; picrylchloride; quinone chloroimide; chloranil; bromanil; benzoquinone; 2,3-dichlorobenzoquinone; dichlorodicyano parabenzoquinone; naphthoquinone; diphenoquinone; tropoquinone; anthraquinone; 1-chloroanthraquinone; dinitroanthraquinone; 4-nitrobenzophenone; 4,4'-dinitrobenzophenone; 4-nitrobenzalmalon dinitrile; α-cyano-β-(p-cyanophenyl)ethylacrylate; 9-anthracenyl methylmalon dinitrile; 1-cyano-(p-nitrophenyl)-2-(p-chlorophenyl)ethylene; 2,7-dinitrofluorenone; 2,4,7-trinitrofluorenone; 2,4,5,7-tetranitrofluorenone; 9-fluorenilydene-(dicyanomethylene malononitrile); polynitro-9-fluorenilydene-(dicyanomethylene malonodinitrile); picric acid; o-nitrobenzoic acid; p-nitrobenzoic acid; 3,5-dinitrobenzoic acid; pentafluorobenzoic acid; 5-nitrosalicylic acid; 3,5-dinitrosalicylic acid; phthalic acid, and mellitic acid, which are a compound having a large electron affinity.

The electron accepting material may be included in any one of the charge generating layer and the charge transporting layer of the photoreceptor layer. When the photoreceptor layer includes therein the electron accepting material, the content thereof is preferably 0.01 part by mass to 200 parts by mass and more preferably 0.1 part by mass to 50 parts by mass with respect to 100 parts by mass of the charge generating material or the charge transporting material.

Furthermore, for the purpose of improving surface properties, a surface modifier may be included therein. Examples thereof include: poly(ethylene tetrafluoride) resin; poly(ethylene trifluoride chloride) resin; poly(ethylene tetrafluoride propylene hexafluoride) resin; polyvinyl fluoride) resin; poly(vinylidene fluoride) resin; poly(ethylene difluoride dichloride) resin; a copolymer thereof; and a grafted fluoropolymer. When the surface modifier is included, the content thereof is preferably 0.1 part by mass to 60 parts by mass and more preferably 5 parts by mass to 40 parts by mass with respect to 100 parts by mass of the binder resin. When the content is 0.1 part by mass or more with respect to 100 parts by mass of the binder resin, surface modification such as imparting surface durability and reducing surface energy is sufficient. When the content is 60 parts by mass or less, lowering in electrophotographic properties is avoided.

As the antioxidant, a hindered phenol antioxidant, an aromatic amine antioxidant, a hindered amine antioxidant, a sulfide antioxidant, an organic phosphoric acid antioxidant, and the like are preferable. Specific examples of the antioxidant include the compounds that are represented by formulas ([chemical 94] to [chemical 101]) in Japanese Patent Laid-Open Publication No. H11-172003. These antioxidants may be used one kind solely or two or more kinds in a mixture. When the photoreceptor layer includes therein the antioxidant, the content thereof is generally preferably 0.01 part by mass to 10 parts by mass and more preferably 0.1 part by mass to 2 parts by mass. The antioxidant may be included in the underlying layer, the blocking layer, or the surface protection layer, besides the photoreceptor layer.

Furthermore, the photoreceptor layer of a single layer electrophotographic photoreceptor is easily formed by using the charge generating material, the charge transporting material, the additives, and others.

Each layer may be formed by using known coating devices. Specifically, examples thereof include: an applicator, a spray coater; a bar coater; a chip coater; a roll coater; a dip coater; and a doctor blade.

The thickness of the photoreceptor layer in the electrophotographic photoreceptor is generally preferably 5 μm to 100 μm and more preferably 8 μm to 50 μm. When the thickness of the photoreceptor layer is 5 μm or more, a high initial potential is easily attained. When 100 μm or less, good electrophotographic properties are attained.

In the electrophotographic photoreceptor of the present invention thus obtained, when the polycarbonate resin mixture is included in the photoreceptor layer, the coating liquid does not become clouded and gelled in the preparation of the photoreceptor layer. In addition, the electrophotographic photoreceptor is excellent in transparency and abrasion resistance (durability) and has excellent electrophotographic properties as well. Excellent electrophotographic properties are allowed to be kept over a long period of time.

Note that, when the electrophotographic photoreceptor of the present invention is used, corona discharging (corotron, scorotron), contact charging (charging roll, charging brush), or the like is used for charging. For light exposure, any one of a halogen lamp, a fluorescent lamp, laser (semiconductor, He—Ne), LED, and photoreceptor internal light exposure may be used. For development, a dry development system including a cascade development, two-component magnetic brush development, one-component insulating toner development, and one-component electroconductive toner development, and a wet development system are used. For transferring, an electrostatic transfer including corona transfer, roller transfer and belt transfer, a pressure transfer, and an adhesive transfer are used. For fixing, heat roller fixing, radiant flash fixing, open fixing, pressure fixing, or the like is used. Furthermore, for cleaning and removal of electricity, a brush cleaner, a magnetic brush cleaner, a static brush cleaner, a magnetic roller cleaner, a blade cleaner, the one having no cleaner, or the like is used. Furthermore, as a toner resin, styrene resin, styrene-acryl copolymer resin, polyester, epoxy resin, a cyclic hydrocarbon polymer, or the like is usable. The shape of the toner may be spherical or amorphous. A toner, the shape of which is regulated in a specific form (spheroidal, potato-like, or the like), is also usable. Any type of toner may be used, which includes pulverized toner, suspension polymerization toner, emulsion polymerization toner, chemical granulation toner, and ester elongation toner.

Resin Composition

The resin composition of the present invention, as long as the polycarbonate resin (A) is included therein along with at least one selected from the polycarbonate resin (B) and the polyester resin (B'), is not particularly limited in the blending ratio thereof. Considering mechanical strength such as elasticity modulus, the content ratio of the polycarbonate resin (A) with respect to the total content of the polycarbonate resin (A), the polycarbonate resin (B), and the polyester resin (B'), that is (A)/((A)+(B)+(B')), is preferably 0.5 to 0.99, more preferably 0.7 to 0.95, and still more preferably 0.75 to 0.95, in terms of mass ratio.

The resin composition of the present invention is high all together in the elasticity modulus, yield strength, and yield elongation, so that the resin composition is usable in any application where mechanical strength is required. If necessary, the resin composition may be used while the other resins, additives, and the like are included therein.

EXAMPLES

The present invention will be further described in detail with reference to the following examples, but it should be construed that the invention is in no way limited to those examples.

Production Example 1

Synthesis of Polycarbonate Resin (A-1)

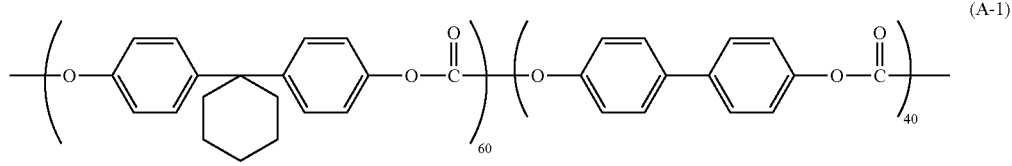

1. Synthesis of Bisphenol Z Bischloroformate 1,1-Bis(4-hydroxyphenyl)cyclohexane (bisphenol Z) in an amount of 73.0 g (0.272 mole) was suspended in 410 mL of methylene chloride and 55.3 g (0.546 mole) of trimethylamine were added thereto and dissolved. The resulting solution was dropped to a solution that was prepared by dissolving 54.5 g (0.551 mole) of phosgene in 225 mL of methylene chloride at 14° C. to 18.5° C. over 2 hours and 50 minutes. After 1 hour agitation at 18.5° C. to 19° C., 250 mL of methylene chloride was distilled out at 10° C. to 22° C. After that, washing with 330 mL of pure water was repeated four times, so that a methylene chloride solution of bisphenol Z bischloroformate having a chloroformate group on the molecular end thereof was obtained. The chloroformate concentration of the resulting solution was 0.91 mole/L. The solid content concentration was 0.22 kg/L. The average number of monomers was 1.15.

Note that, the average number of monomers (n') was obtained by using the following equation.

Average number of monomers $(n')=1+(M_{av}-M^1)/M^2$

In the above equation, Mav represents 2×1,000/CF valence, wherein CF valence (N/kg)=CF value/concentration. CF value (N)=number of chlorine atoms per 1 L of reaction solution, which are contained in the bischloroformate compound represented by the following formula (a). Concentration (kg/L)=amount of solid content that is obtained after 1 L of reaction solution is concentrated. $M^1$ represents the molecular weight of the bischloroformate compound when n=1 in the following formula (a). $M^2$ represents $M^1$–98.92 (98.92 represents the total atomic amount of two chlorine atoms, one oxygen atom, and one carbon atom that are eliminated by polycondensation among the bischloroformate compounds).

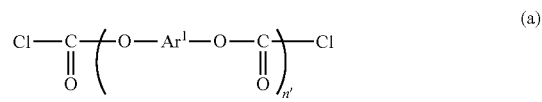

In the above formula (a), $Ar^1$ represents a bisphenol compound or a moiety that forms a biphenol compound except hydroxyl groups.

2. Synthesis of Polycarbonate Resin (A-1)

To a reactor vessel, a mechanical stirrer, agitation propellers, and baffle plates were attached, and bisphenol Z bischloroformate (24 mL) synthesized above and methylene chloride (36 mL) were introduced. p-Tert-butylphenol (hereinafter, called as PTBP) (0.04 g) serving as an end-stopping agent was added thereto. Agitation was performed so as to attain sufficient mixing.

To the resulting solution, a separately prepared biphenol monomer solution (a solution that was obtained as: a 2N sodium hydroxide solution in an amount of 10 mL was prepared and cooled below room temperature; and 0.1 g of hydrosulfite serving as an antioxidant and 2.8 g of 4,4'-biphenol were added and fully dissolved) was added in a full amount. After the solution was cooled until the temperature inside of the reactor vessel reached 15° C., a trimethylamine aqueous solution (7 volume %) in an amount of 0.2 mL was added while agitated. Agitation was continued for 1 hour.

The resulting reaction mixture was diluted with 0.2 L of methylene chloride and 0.1 L of water so as to be washed. The resulting lower layer was separated and further washed with 0.1 L of water once, 0.1 L of 0.03N hydrochloric acid once, and 0.1 L of water five times in order. The resulting methylene chloride solution was dropped into warm water while agitated so as to evaporate methylene chloride and to obtain a solid content of resin. The resulting solid content of resin was filtered off and dried so as to produce the polycarbonate resin (A-1) having the above described structure. The reduced viscosity ($\eta_{SP}/C$) of the polycarbonate resin (A-1) was 1.17 dL/g. By NMR analysis, it was confirmed that the polycarbonate resin was composed of the above described repeating unit and composition.

Production Example 2

Synthesis of Polycarbonate Resin (A-2)

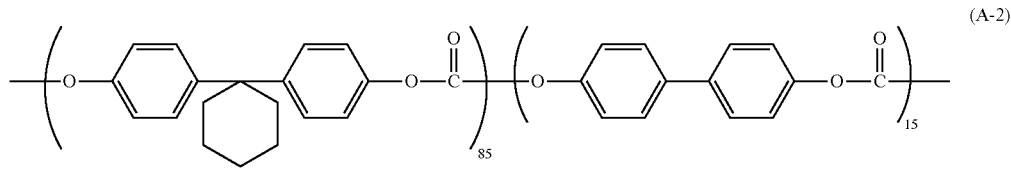

1. Synthesis of Bisphenol Z Bischloroformate

A solution dissolving 0.2 kg of 1,1-bis(4-hydroxyphenyl) cyclohexane in 1.2 kg of a 16 mass % potassium hydroxide aqueous solution, and 1.4 kg of methylene chloride were mixed. While the resulting mixture solution was agitated and cooled, phosgene gas was blown into the solution at a rate of 1 L/min. until the pH thereof became 9 or lower. Then, the resulting reaction solution was stood still and separated. In the resulting organic layer, a methylene chloride solution of an oligomer that had a polymerization degree of 2 to 6 and chloroformate groups on the molecular terminals thereof was obtained. The chloroformate concentration was 0.42 mole/L and the solid content concentration was 0.21 kg/L.

2. Synthesis of Polycarbonate Resin (A-2)

Then, 309 mL of the above bisphenol Z bischloroformate solution were dissolved in 167 mL of methylene chloride. Furthermore, after 0.4 g of p-tert-butylphenol serving as a molecular weight modifier was added, a solution dissolving 11 g of 4,4'-biphenol in 160 mL of a 2 mole/L sodium hydroxide aqueous solution was added to the solution. After that, while the resulting mixture solution was vigorously agitated, 1.5 mL of a 7 mass % triethylamine aqueous solution serving as a catalyst were added so as to perform reaction at 15° C. for 1.5 hours while agitated. After the reaction was terminated, the resulting reaction product was diluted with 1,000 mL of methylene chloride, and then washed, in order, with 200 mL of water twice, 200 mL of 0.01 mole/L hydrochloric acid once, further 200 mL of water twice. The resulting organic layer was put into methanol and purified by reprecipitation so as to obtain the polycarbonate resin (A-2).

The reduced viscosity ($\eta_{SP}/C$) of the polycarbonate resin (A-1) thus obtained was 1.1 dL/g, which was measured in a methylene chloride solvent solution having a concentration of 0.5 g/dL at 20° C.

By NMR analysis, it was confirmed that the chemical structure and copolymer composition of the resulting polycarbonate resin coincided with the polycarbonate resin (A-2).

Production Example 3

Synthesis of Polycarbonate Resin (B-1)

1. Synthesis of Bisphenol E Bischloroformate

A solution dissolving 0.2 kg of 1,1-bis(4-hydroxyphenyl) ethane (bisphenol E) in 1.2 kg of a 22 mass % sodium hydroxide aqueous solution, and 1.4 kg of methylene chloride were mixed. While the resulting mixture solution was agitated and cooled, phosgene gas was blown into the solution at a rate of 1 L/min. until the pH thereof became 9 or lower. Then, the resulting reaction solution was stood still and separated. In the resulting organic layer, a methylene chloride solution of an oligomer that had a polymerization degree of 2 to 6 and had chloroformate groups on the molecular terminals thereof was obtained. The chloroformate concentration was 0.5 mole/L and the solid content concentration was 0.21 kg/L.

2. Synthesis of Polycarbonate Resin (B-1)

Then, 309 mL of the above bisphenol E bischloroformate solution were dissolved in 167 mL of methylene chloride. Furthermore, after 0.9 g of p-tert-butylphenol serving as a molecular weight modifier was added, a solution dissolving 15 g of 4,4'-biphenol in 160 mL of a 2 mole/L sodium hydroxide aqueous solution was added to the solution. After that, while the resulting mixture solution was vigorously agitated, 1.5 mL of a 7 mass % triethylamine aqueous solution serving as a catalyst were added so as to perform reaction at 15° C. for 1.5 hours while agitated. After the reaction was terminated, the resulting reaction product was diluted with 1000 mL of methylene chloride, and then washed, in order, with 200 mL of water twice, 200 mL of 0.01 mole/L hydrochloric acid once, further 200 mL of water twice. The resulting organic layer was put into methanol and purified by reprecipitation so as to obtain the polycarbonate resin (B-1).

The reduced viscosity ($\eta_{SP}/C$) of thus obtained polycarbonate resin was 1.1 dL/g, which was measured in a methylene chloride solvent solution having a concentration of 0.5 g/dL at 20° C.

By NMR analysis, it was confirmed that the chemical structure and copolymer composition of the resulting polycarbonate resin coincided with the polycarbonate resin (B-1).

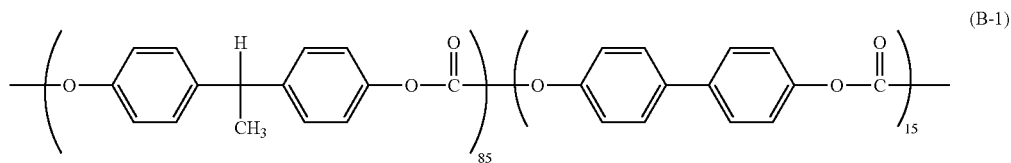

Production Example 4

Synthesis of Polyester Resin (B'-1)

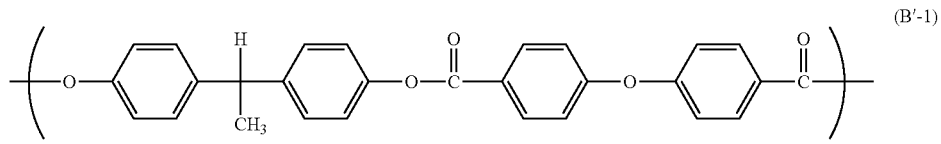

To a reactor vessel, a mechanical stirrer, agitation propellers, and baffle plates were attached, and 6.7 g of 4,4'-oxybenzoyl chloride and 236 mL of methylene chloride were introduced. p-tert-butylphenol (hereinafter, called as PTBP) (0.05 g) serving as an end-stopping agent was added thereto. Agitation was performed so as to attain sufficient mixing.

To the resulting solution, a separately prepared alkaline aqueous solution of 1,1-bis(4-hydroxyphenyl)ethane was added in full amount (preparation method of the monomer solution: 3.6 g of sodium hydroxide were dissolved in 419 mL of water; after the resulting solution was cooled below room temperature, 4.8 g of 1,1-bis(4-hydroxyphenyl)ethane and 0.1 g of hydrosulfite serving as an antioxidant were added and fully dissolved so as to prepare the solution); after the solution was cooled until the temperature inside of the reactor vessel reached 15° C., 0.059 g of tributylbenzylammonium chloride was added while agitated; and agitation was continued for 1 hour at a polymerization temperature of 20° C. or lower.

The resulting reaction mixture was diluted with 135 mL of methylene chloride and 500 mL of water so as to be washed. The resulting lower layer was separated and further washed, in order, with 500 mL of water once, an acetic acid aqueous solution (containing 0.33 mL of acetic acid and 500 mL of water) once, and 500 mL of water three times. The resulting methylene chloride solution was dropped into methanol while agitated. The resulting re-precipitate was filtered off and dried to obtain the polyester resin (B'-1) having the above described structure.

Thus obtained polyester resin (B'-1) was dissolved in methylene chloride to prepare a solution having a concentration of 0.5 g/dL. The reduced viscosity ($\eta_{SP}/C$) at 20° C. was measured to be 1.1 dL/g.

By NMR analysis, it was confirmed that the chemical structure and copolymerization composition of the thus obtained polycarbonate resin coincided with the above described polyester resin (B'-1).

Production Example 5

Synthesis of Polycarbonate Resin (A-3)

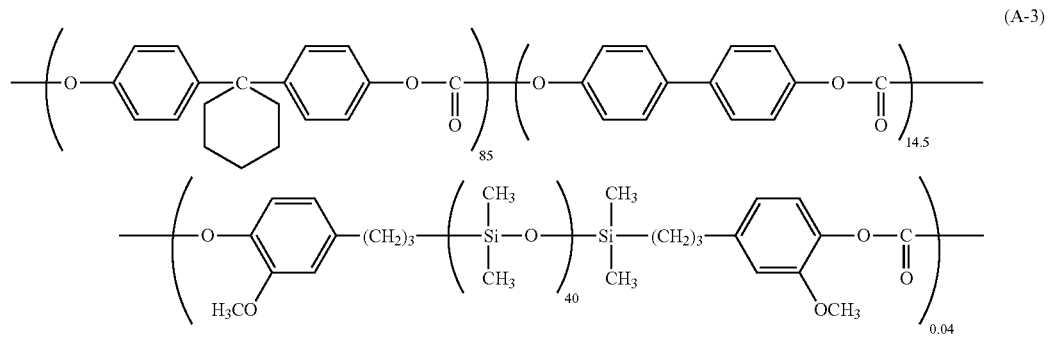

In Production Example 2, in the synthesis of the polycarbonate resin (A-2), except that 11 g of 4,4'-biphenol were replaced by 11 g of 4,4'-biphenol and 2.3 g of polydimethyl siloxane having phenol modified both ends of the following formula, similar synthesis was performed, whereby the polycarbonate resin (A-3) having the above described structure was obtained.

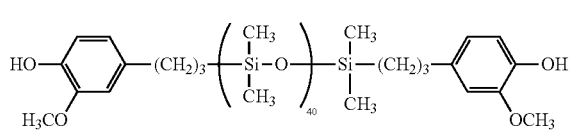

Thus obtained polycarbonate resin (A-3) was dissolved in methylene chloride to prepare a solution having a concentration of 0.5 g/dL. The reduced viscosity ($\eta_{SP}/C$) at 20° C. was measured to be 1.12 dL/g.

By NMR analysis, it was confirmed that the chemical structure and copolymerization composition of the thus obtained polycarbonate resin coincided with the above described polycarbonate resin (A-3).

Production Example 6

Synthesis of Polycarbonate Resin (A-4)

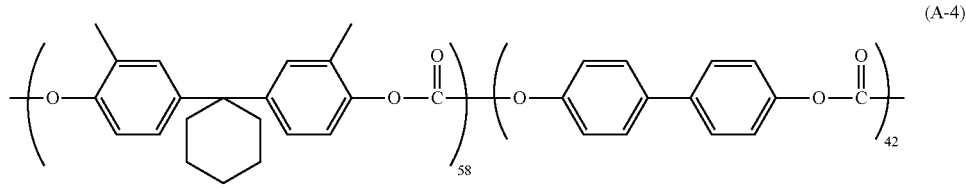

1. Synthesis of Bisphenol CZ Oligomer (Bischloroformate)

To a mixture solution of 266 g (0.897 mole) of 1,1-bis (3-methyl-4-hydroxyphenyl) cyclohexane (bisphenol CZ), 1,058 mL of methylene chloride, and 187 g (1.89 moles) of phosgene, a solution diluting 199.4 g (1.97 moles) of triethylamine with 460 mL of methylene chloride was dropped at 13° C. to 16° C. over 3 hours and 6 minutes. The resulting reaction mixture was agitated at 14° C. to 16° C. for 1 hour and 38 minutes. To the reaction mixture, 5.0 mL of concentrated hydrochloric acid and 200 mL of pure water were added so as to wash the reaction mixture. After that, water washing was repeated until the water layer became neutral, whereby a methylene chloride solution (CZ-CF) of bisphenol CZ oligomer that had chloroformate groups on the molecular terminal thereof was obtained.

The chloroformate concentration of the resulting solution was 1.01 mole/L. The solid content concentration was 0.22 kg/L. The average number of monomers was 1.10.

2. Production of Polycarbonate Resin (A-4)

To a reactor vessel, a mechanical stirrer, agitation propellers, and baffle plates were attached, and CZ-CF (166 mL) synthesized above and methylene chloride (245 mL) were introduced. p-Tert-butylphenol (PTBP) (0.253 g) serving as an end-stopping agent was added thereto. Agitation was performed so as to attain sufficient mixing. After the resulting solution was cooled until the temperature inside the reactor vessel reached 15° C. or lower, a 4,4'-biphenol solution that was separately prepared was added in full amount to the solution. Furthermore, a triethylamine aqueous solution (7 volume %) was added in an amount of 2.0 mL while agitated. Agitation was continued for 1 hour.

Here, the preparation method of the 4,4'-biphenol solution was as follows: 140 mL of a 5 N sodium hydroxide aqueous solution (10.1 g of sodium hydroxide) was prepared and cooled below room temperature; after that, 0.1 g of hydrosulfite serving as an antioxidant and 15.26 g of 4,4'-biphenol were added and fully dissolved.

The resulting reaction mixture was diluted with 0.2 L of methylene chloride and 0.1 L of water so as to be washed. The resulting lower layer was separated and further washed, in order, with 0.1 L of water once, 0.1 L of 0.03 N hydrochloric acid once, and 0.1 L of water three times. The resulting methylene chloride solution was dropped into methanol while agitated. The resulting re-precipitate was filtered off and dried so as to obtain the polycarbonate resin (A-4).

The resin was dissolve in methylene chloride to prepare a solution having a concentration of 0.5 g/dL. The reduced viscosity [$\eta_{SP}$/C] at 20° C. was measured to be 1.13 dL/g.

In addition, the structure and composition of the thus obtained polycarbonate resin were analyzed by $^1$H-NMR spectrum and $^{13}$C-NMR spectrum. It was confirmed that the above described repeating unit was included therein.

Example 1

Preparation of Coating Liquid and Production of Electrophotographic Photoreceptor An electrophotographic photoreceptor was produced as: a polyethylene terephthalate resin film having vacuum-deposited aluminum metal was used as an electroconductive substrate; and a charge generating layer and a charge transporting layer were successively laminated so as to form a laminated photoreceptor layer on the surface of the substrate. As the charge generating material, 0.5 part by mass of oxotitanium phthalocyanine was used. As the binder resin, 0.5 part by mass of butyral resin was used. There were added to 19 parts by mass of methylene chloride serving as a solvent and dispersed with a ball mill. The resulting dispersion was coated on the surface of the electroconductive substrate film with a bar coater, and dried to form a charge generating layer with a thickness of about 0.5 μm.

Then, as the charge transporting material, 0.375 g of an aromatic amine compound (CTM-1) represented by the following formula,

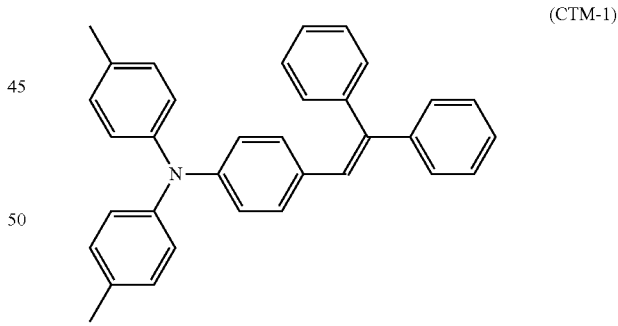

as the binder resin, 0.563 g of the polycarbonate resin (A-1) obtained in Production Example 1 and 0.063 g of the polycarbonate resin (B-1) obtained in Production Example 3, were dispersed in 10 mL of tetrahydrofuran to prepare a coating liquid. The thus obtained coating liquid was coated with an applicator on the charge generating layer and dried to form a charge transporting layer having a thickness of about 20 μm.

Then, the film condition of the resulting electrophotographic photoreceptor was confirmed by visual inspection. Furthermore, by using an electrostatic charging test apparatus of "CYNTHIA54" (manufactured by GENTEC Corp.), the photoreceptor was charged at minus 700 V in an EV measurement mode. The half decay exposure (sensitivity: E50% ($\mu$J/cm$^2$)) was measured, and the exposure (E100 ($\mu$J/cm$^2$) at which the residual potential exhibited minus 100 V was measured. E50% was used as an index of sensitivity. E100 was an index of residual potential. As E50% was smaller, the sensitivity was evaluated to be better. As E100 was smaller, the residual potential was evaluated to be smaller.

In addition, abrasion resistance was evaluated as follows.

Evaluation Method of Abrasion Resistance (Durability)

The polycarbonate resin (A-1) obtained in Production Example 1 in an amount of 0.563 g, the polycarbonate resin (B-1) obtained in Production Example 3 in an amount of 0.063 g, and the aromatic amine compound (CTM-1) in an amount of 0.375 g were dissolved in methylene chloride (10 mL). A film was prepared by casting on a commercial PET film with an applicator. The resulting film was heated under vacuum to remove the solvent, whereby a film sample having a thickness of about 20 $\mu$m was obtained.

The abrasion resistance of the resulting film sample was evaluated on the cast face thereof by using a Suga abrasion tester of "NUS-ISO-3" (manufactured by Suga Test Instruments Co., Ltd.). Test conditions were: a 4.9 N load was applied to abrasion paper that contained aluminum particles having a particle size of 3 $\mu$m so as to contact the paper to the film sample surface; back-and-forth motion was repeated 2,000 times; and the decreased mass amount of the film sample was measured, which was evaluated as an index of durability. The results are shown in Table 1.

Example 2

An electrophotographic photoreceptor and a film sample were prepared substantially similarly to EXAMPLE 1, except that the used amount of the polycarbonate resin (A-1) was changed to 0.5 g and the used amount of the polycarbonate resin (B-1) was changed to 0.125 g. Each of the evaluations was performed. The results are shown in Table 1.

Example 3

An electrophotographic photoreceptor and a film sample were prepared substantially similarly to EXAMPLE 1, except that 0.563 g of the polycarbonate resin (A-1) was changed to 0.45 g of the polycarbonate resin (A-2), the used amount of the polycarbonate resin (B-1) was changed to 0.05 g and the aromatic amine compound (CTM-1) was charged to 0.5 g of the following aromatic amine compound (CTM-2). Each of the evaluations was performed. The results are shown in Table 1.

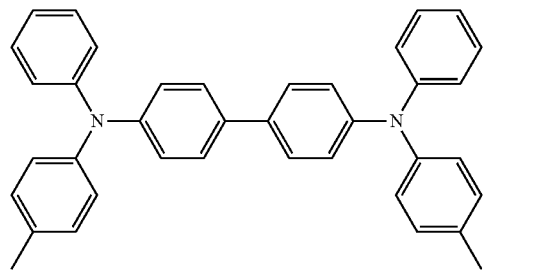

(CTM-2)

Example 4

An electrophotographic photoreceptor and a film sample were prepared substantially similarly to EXAMPLE 3, except that the used amount of the polycarbonate resin (A-2) was changed to 0.35 g and the used amount of the polycarbonate resin (B-1) was changed to 0.15 g. Each of the evaluations was performed. The results are shown in Table 1.

Example 5

An electrophotographic photoreceptor and a film sample were prepared substantially similarly to EXAMPLE 3, except that the used amount of the polycarbonate resin (A-2) was changed to 0.25 g and the used amount of the polycarbonate resin (B-1) was changed to 0.25 g. Each of the evaluations was performed. The results are shown in Table 1.

Example 6

An electrophotographic photoreceptor and a film sample were prepared substantially similarly to EXAMPLE 1, except that the polyester resin (B'-1) that was obtained in Production Example 4 was used in place of the polycarbonate resin (B-1). Each of the evaluations was performed. The results are shown in Table 1.

Example 7

An electrophotographic photoreceptor and a film sample were prepared substantially similarly to EXAMPLE 1, except that the polycarbonate resin (A-2) that was obtained in Production Example 2 was used in place of the polycarbonate resin (A-1). Each of the evaluations was performed. The results are shown in Table 1.

Example 8

An electrophotographic photoreceptor and a film sample were prepared substantially similarly to EXAMPLE 1, except that the polycarbonate resin (A-3) that was synthesized in Production Example 5 was used in place of the polycarbonate resin (A-1) and that the amount of the charge transporting material (CTM-1) was changed to 0.417 g. Each of the evaluations was performed. The results are shown in Table 1.

Example 9

An electrophotographic photoreceptor and a film sample were prepared substantially similarly to EXAMPLE 8, except that the amount of the polycarbonate resin (A-3) was changed to 0.532 g and the amount of the polycarbonate resin (B-1) was changed to 0.094 g. Each of the evaluations was performed. The results are shown in Table 1.

Example 10

An electrophotographic photoreceptor and a film sample were prepared substantially similarly to EXAMPLE 8, except that the amount of the polycarbonate resin (A-3) was changed to 0.50 g and the amount of the polycarbonate resin (B-1) was changed to 0.125 g. Each of the evaluations was performed. The results are shown in Table 1.

Example 11

An electrophotographic photoreceptor and a film sample were prepared substantially similarly to EXAMPLE 8, except that the amount of the polycarbonate resin (A-3) was changed to 0.438 g and the amount of the polycarbonate resin (B-1) was changed to 0.188 g. Each of the evaluations was performed. The results are shown in Table 1.

Example 12

An electrophotographic photoreceptor and a film sample were prepared substantially similarly to EXAMPLE 1, except that the polycarbonate resin (A-4) that was synthesized in Production Example 6 was used in place of the polycarbonate resin (A-1) and that the amount of the charge transporting material (CTM-1) was changed to 0.417 g. Each of the evaluations was performed. The results are shown in Table 1.

Example 13

An electrophotographic photoreceptor and a film sample were prepared substantially similarly to EXAMPLE 12, except that the amount of the polycarbonate resin (A-3) was changed to 0.50 g and the amount of the polycarbonate resin (B-1) was changed to 0.125 g. Each of the evaluations was performed. The results are shown in Table 1.

Comparative Example 1

An electrophotographic photoreceptor and a film sample were prepared substantially similarly to EXAMPLE 1, except that the polycarbonate resin (B-1) was not used and only the polycarbonate resin (A-1) was used in an amount of 0.626 g. Each of the evaluations was performed. The results are shown in Table 2.

Comparative Example 2

An electrophotographic photoreceptor and a film sample were prepared substantially similarly to EXAMPLE 3, except that the polycarbonate resin (B-1) was not used and only the polycarbonate resin (A-2) was used in an amount of 0.5 g. Each of the evaluations was performed. The results are shown in Table 2.

Comparative Example 3

An electrophotographic photoreceptor and a film sample were prepared substantially similarly to EXAMPLE 2, except that the polycarbonate resin (A-1) was not used and only the polycarbonate resin (B-1) was used in an amount of 0.626 g. Each of the evaluations was performed. The results are shown in Table 2.

Comparative Example 4

An electrophotographic photoreceptor and a film sample were prepared substantially similarly to EXAMPLE 3, except that the polycarbonate resin (C-1) (reduced viscosity: 1.1 dL/g) that was composed of the following structural unit was used in place of the polycarbonate resin (B-1). Each of the evaluations was performed. The results are shown in Table 2.

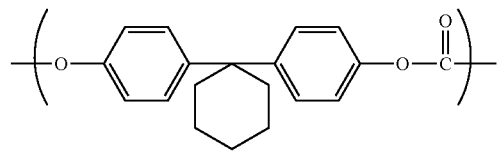

(C-1)

Comparative Example 5

An electrophotographic photoreceptor and a film sample were prepared substantially similarly to EXAMPLE 4, except that the polycarbonate resin (C-1) was used in place of the polycarbonate resin (B-1). Each of the evaluations was performed. The results are shown in Table 2.

Comparative Example 6

An electrophotographic photoreceptor and a film sample were prepared substantially similarly to EXAMPLE 5, except that the polycarbonate resin (C-1) was used in place of the polycarbonate resin (B-1). Each of the evaluations was performed. The results are shown in Table 2.

Comparative Example 7

An electrophotographic photoreceptor and a film sample were prepared substantially similarly to EXAMPLE 8, except that the polycarbonate resin (B-1) was not used and only the polycarbonate resin (A-3) was used in an amount of 0.626 g. Each of the evaluations was performed. The results are shown in Table 2.

Comparative Example 8

An electrophotographic photoreceptor and a film sample were prepared substantially similarly to EXAMPLE 8, except that the polycarbonate resin (A-3) was not used and only the polycarbonate resin (B-1) was used in an amount of 0.626 g. Each of the evaluations was performed. The results are shown in Table 2.

Comparative Example 9

An electrophotographic photoreceptor and a film sample were prepared substantially similarly to EXAMPLE 8, except that the polycarbonate resin (C-1) was used in place of the polycarbonate resin (A-3). Each of the evaluations was performed. The results are shown in Table 2.

Comparative Example 10

An electrophotographic photoreceptor and a film sample were prepared substantially similarly to EXAMPLE 10, except that the polycarbonate resin (C-1) was used in place of the polycarbonate resin (A-3). Each of the evaluations was performed. The results are shown in Table 2.

Comparative Example 11

An electrophotographic photoreceptor and a film sample were prepared substantially similarly to EXAMPLE 7, except that the polycarbonate resin (C-1) was used in place of the polycarbonate resin (A-3). Each of the evaluations was performed. The results are shown in Table 2.

Comparative Example 12

An electrophotographic photoreceptor and a film sample were prepared substantially similarly to COMPARATIVE EXAMPLE 7, except that the polycarbonate resin (A-4) that was obtained in Production Example 6 was used in place of the polycarbonate resin (A-3). Each of the evaluations was performed. The results are shown in Table 2.

TABLE 1

| | | | | | | | EXAMPLES | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| Polycarbonate resin (A) | | A-1 | A-1 | A-2 | A-2 | A-2 | A-1 | A-2 | A-3 | A-3 | A-3 | A-3 | A-4 | A-4 |
| Polycarbonate resin (B) | | B-1 | B-1 | B-1 | B-1 | B-1 | | B-1 | B-1 | B-1 | B-1 | B-1 | B-1 | B-1 |
| Polyester resin (B') | | | | | | | B'-1 | | | | | | | |
| Polycarbonate resin (C) | | | | | | | | | | | | | | |
| (A)/[(A) + (B) + (B')] (mass ratio) | | 0.9 | 0.8 | 0.9 | 0.7 | 0.5 | 0.9 | 0.9 | 0.9 | 0.85 | 0.8 | 0.7 | 0.9 | 0.8 |
| Charge transporting material | | CTM-1 | CTM-1 | CTM-2 | CTM-2 | CTM-2 | CTM-1 | CTM-1 | CTM-1 | CTM-1 | CTM-1 | CTM-1 | CTM-1 | CTM-1 |
| Content ratio of charge transporting material (mass %) | | 37.5 | 37.5 | 50 | 50 | 50 | 37.5 | 37.5 | 40 | 40 | 40 | 40 | 40 | 40 |
| Evaluation results | Film conditions | transparent | transparent | transparent | transparent | transparent | transparent | transparent | transparent | transparent | transparent | transparent | transparent | transparent |
| | Electrophotographic properties E50% ($\mu J/cm^2$) | 0.15 | 0.15 | 0.22 | 0.21 | 0.22 | 0.20 | 0.15 | 0.14 | 0.14 | 0.14 | 0.14 | 0.15 | 0.15 |
| | E100 ($\mu J/cm^2$) | 0.23 | 0.24 | 0.34 | 0.34 | 0.31 | 0.37 | 0.23 | 0.22 | 0.22 | 0.22 | 0.22 | 0.23 | 0.23 |
| | Abrasion amount (mg) | 0.52 | 0.57 | 1.09 | 1.24 | 1.32 | 0.55 | 0.95 | 0.85 | 0.80 | 0.82 | 0.86 | 0.41 | 0.40 |

TABLE 2

| | | COMPARATIVE EXAMPLES | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Polycarbonate resin (A) | | A-1 | A-2 | | A-2 | A-2 | A-2 | A-3 | | | | | A-4 |
| Polycarbonate resin (B) | | | | B-1 | | | | | B-1 | B-1 | B-1 | | |
| Polyester resin (B') | | | | | | | | | | | | | |
| Polycarbonate resin (C) | | | | | C-1 | C-1 | C-1 | | C-1 | C-1 | C-1 | | |
| (A)/[(A) + (B) + (B')] (mass ratio) | | 1.0 | 1.0 | 0 | 0.9 *[2] | 0.7 *[2] | 0.5 *[2] | 1.0 | 0 | 0 | 0 | 0 | 1.0 |
| Charge transporting material | | CTM-1 | CTM-2 | CTM-1 | CTM-2 | CTM-2 | CTM-2 | CTM-1 | CTM-1 | CTM-1 | CTM-1 | CTM-1 | CTM-1 |
| Content ratio of charge transporting material (mass %) | | 37.5 | 50 | 37.5 | 50 | 50 | 50 | 40 | 40 | 40 | 40 | 40 | 40 |
| Evaluation results | Film conditions | Transparent | Transparent | Partly cloud | Transparent | Transparent | Transparent | Transparent | Partly cloud | Transparent | Transparent | Transparent | Transparent |
| | Electrophotographic properties E50% ($\mu J/cm^2$) | 0.16 | 0.16 | —*[1] | 0.16 | 0.16 | 0.16 | 0.14 | —*[1] | 0.16 | 0.15 | 0.14 | 0.15 |
| | E100 ($\mu J/cm^2$) | 0.24 | 0.34 | —*[1] | 0.34 | 0.34 | 0.33 | 0.22 | —*[1] | 0.34 | 0.34 | 0.33 | 0.23 |
| | Abrasion amount (mg) | 0.59 | 1.37 | 1.06 | 1.38 | 1.40 | 1.42 | 1.02 | 1.21 | 1.21 | 1.21 | 1.23 | 0.49 |

*[1] Not detected
*[2] Calculated as the mass ratio of the polycarbonate resin (A) with respect to the total resins Tables 1 and 2 show that the photographic photoreceptors of the Examples are high in transparency and excellent in electrophotographic properties and abrasion resistance. Note that, regarding the polycarbonate resin (A), it is shown that the polycarbonate resin (A-1) provides still more improved abrasion resistance than the polycarbonate resin (A-2).

On the other hand, in COMPARATIVE EXAMPLES 1, 2, 7, and 12 in which the polycarbonate resin (B) or the polyester resin (B') is not used, the transparency and electrophotographic properties are good, but the abrasion resistance is more degraded as compared with EXAMPLES 1, 3, 8, and 13. In the case of COMPARATIVE EXAMPLES 3 and 8 in which the polycarbonate resin (A) is not used, the abrasion resistance is more degraded as compared with EXAMPLES 2 and 8, the transparence is lowered, and the electrophotographic properties are worsened. Furthermore, in COMPARATIVE EXAMPLES 4 to 6 and 11 in which the polycarbonate resin (C) is used in place of the polycarbonate resin (B) or the polyester resin (B'), it is shown that the electrophotographic properties are good, but the abrasion resistance is degraded.

Furthermore, when EXAMPLE 8 is compared with COMPARATIVE EXAMPLE 9 and EXAMPLE 10 is compared with COMPARATIVE EXAMPLE 10, it is shown that the electrophotographic properties are worsened and the abrasion resistance is degraded when the polycarbonate resin (C-1) is used in place of the polycarbonate resin (A-3). Considering COMPARATIVE EXAMPLES 9 and 10, it is shown that a still more improvement is required when the binder resin that is disclosed in Patent Document 7 is used as a binder resin of electrophotographic photoreceptors.

Note that, the differences in the abrasion resistance between EXAMPLES and COMPARATIVE EXAMPLES are not extremely large in terms of the numerical values thereof. However, when EXAMPLES and COMPARATIVE EXAMPLES are rightly compared, the abrasion resistance is obviously improved in all EXAMPLES that are in accordance with the present invention. Large technological implications are considered to be involved therein.

Examples 14 to 16

The polycarbonate resin (A-1) and the polycarbonate resin (B-1) were mixed in a ratio shown in Table 3 so as to prepare a tetrahydrofuran solution. The solution was cast on a glass petri dish, air-dried, and further dried at 120° C. for 24 hours to prepare a film having a thickness of 100 μm.

The resulting film was subjected to tensile test in accordance with the following method. Whereby, elastic modulus (N/mm$^2$) yield strength (N/mm$^2$), and yield elongation (%) were measured.

Tensile Test

The films that were obtained by the method described above were subjected to Film tensile test, in accordance with JIS-K7262, by using a tensile testing machine of "EZ GRAPH" (model name, manufactured by Shimadzu Corp.), at 25° C. and a stretching speed of 1 mm/sec. Whereby, elastic modulus (N/mm$^2$), yield strength (N/mm$^2$), and yield elongation (%) were measured. The results are shown in Table 3.

Comparative Examples 13 and 14

Films were prepared substantially similarly to EXAMPLE 14, except that the polycarbonate resin (B-1) was not used, or the polycarbonate resin (A-1) was not used. The tensile test described above was performed. The results are shown in Table 3.

TABLE 3

| | | EXAMPLES | | | COMPARATIVE EXAMPLES | |
|---|---|---|---|---|---|---|
| | | 14 | 15 | 16 | 13 | 14 |
| Polycarbonate resin (A) | | A-1 | A-1 | A-1 | A-1 | |
| Polycarbonate resin (B) | | B-1 | B-1 | B-1 | | B-1 |
| (A)/[(A) + (B) + (B')] (mass ratio) | | 0.9 | 0.8 | 0.7 | 1.0 | 0 |
| Tensile test | Elastic modulus (N/mm$^2$) | 2,207 | 2,145 | 2,213 | 2,148 | 2,067 |
| | Yield strength (N/mm$^2$) | 64 | 61 | 58 | 58 | 56 |
| | Yield elongation (%) | 5.1 | 4.9 | 4.6 | 4.6 | 4.2 |

Table 3 shows that the strength is improved by blending the polycarbonate resin (A-1) and the polycarbonate resin (B-1) as compared with the case where each of them is used solely. The reason why the result is obtained is considered as: strength is enhanced by an intermolecular interaction, an effect of increasing the density of packing state, and the like.

INDUSTRIAL APPLICABILITY

The electrophotographic photoreceptor of the present invention is usable in various kinds of the electrophotographic fields including copy machines (monochrome, multicolor, full color; analogue, or digital); printers (laser, LED, or liquid crystal shutter); facsimiles; platemakers; and devices having multi functions of these. In addition, as a resin composition that has excellent mechanical strengths such as high elastic modulus, the resin composition is usable also for the other coating resins, films, and the like.

The invention claimed is:
1. An electrophotographic photoreceptor, comprising an electroconductive substrate and a photoreceptor layer,
the photoreceptor layer comprising: a polycarbonate resin (A) that has a structural unit represented by the following formula (I); and
at least one selected from a polycarbonate resin (B) having a structural unit represented by the following formula (IV) and a polyester resin (B') having a structural unit represented by the following formula (V);
$n^A/(m^A + n^A)$ in the formula (I) is from 0.25 to 0.7, and $n^B/(m^B + n^B)$ in the formula (IV) is from 0.1 to 0.7:

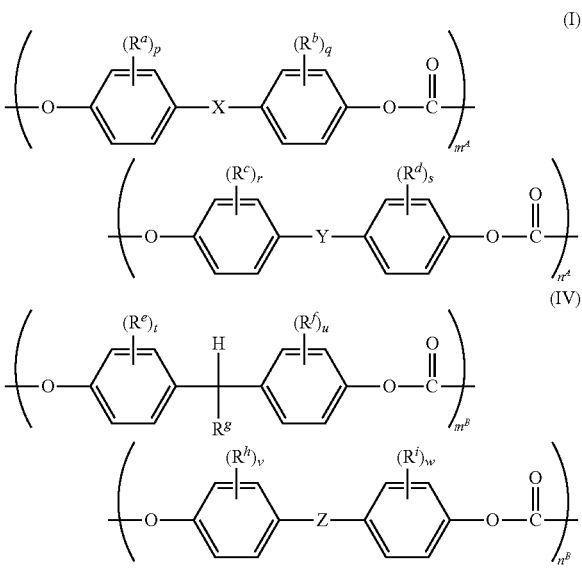

(V)

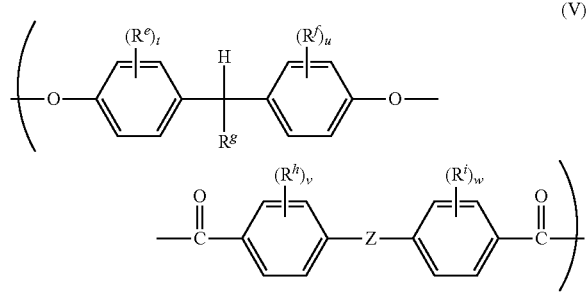

in the formulas, each of $R^a$, $R^b$, $R^c$, $R^d$, $R^e$, $R^f$, $R^h$ and $R^i$ represents, independently from one another, a halogen atom, a substituted or non-substituted alkyl group having 1 to 8 carbon atoms, a substituted or non-substituted cycloalkyl group having 3 to 8 carbon atoms, or a substituted or non-substituted phenyl group;

each of p, q, r, s, t, u, v and w represents, independently from one another, an integer of 0 to 4;

$R^g$ represents an alkyl group having 1 to 8 carbon atoms;

X represents an alkylene group having 1 to 8 carbon atoms, an isopropylidene group, a sec-butylidene group, a cycloalkylene group having 5 to 15 carbon atoms, a cycloalkylidene group having 5 to 15 carbon atoms, —S—, —SO—, —SO$_2$—, —CO—, or a divalent bonding group that is represented by the following formula (X-1) or the following formula (X-2); the benzene rings that compose formula (X-2) may be substituted with an alkyl group having 1 to 8 carbon atoms or a substituted or non-substituted phenyl group;

(X-1)

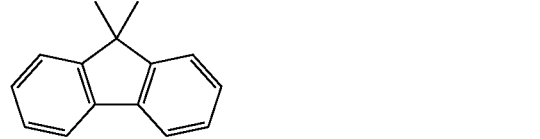

(X-2)

Y represents a single bond or —O—;

each of $m^A$, $n^A$, $m^B$ and $n^B$ represents a composition ratio (mole ratio) of the structural unit;

and Z represents a single bond or —O—.

2. The electrophotographic photoreceptor according to claim 1, wherein, the content ratio of the polycarbonate resin (A) with respect to the total amount of the polycarbonate resin (A), the polycarbonate rein (B), and the polyester resin (B'), that is (A)/((A)+(B)+(B')), is from 0.5 to 0.99 by mass ratio.

3. The electrophotographic photoreceptor according to claim 1, wherein, the structural unit represented by formula (I) is a structural unit described below,

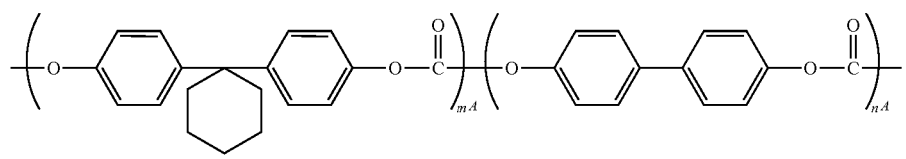

in the formula, each of $m^A$ and $n^A$ is the same as defined above.

4. The electrophotographic photoreceptor according to claim 1, comprising, as a binder layer of a photoreceptor layer, the polycarbonate resin (A) and at least one selected from the polycarbonate resin (B) and the polyester resin (B').

5. The electrophotographic photoreceptor according to claim 1, wherein, at least one selected from the polycarbonate resin (A), the polycarbonate resin (B), and the polyester resin (B') includes therein a polyalkylsiloxane structural unit represented by the following formula (VI),

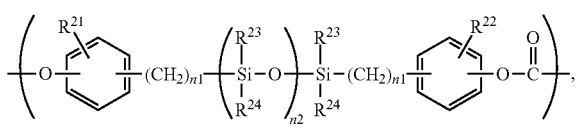

(VI)

in the formula, each of $R^{21}$ and $R^{22}$ represents, independently from each other, a hydrogen atom, a halogen atom, an alkyl group having 1 to 12 carbon atoms, or a substituted or non-substituted aryl group having 6 to 12 carbon atoms; each of $R^{23}$ and $R^{24}$ represents, independently from each other, an alkyl group having 1 to 12 carbon atoms, an alkoxy group having 1 to 12 carbon atoms, or a substituted or non-substituted aryl group having 6 to 12 carbon atoms; n1 represents an integer of 2 to 4 and n2 represents an integer of 25 to 220.

6. A resin composition, comprising:
(1) a polycarbonate resin (A) that has a structural unit represented by the following formula (I); and
(2) at least one selected from a polycarbonate resin (B) having a structural unit represented by the following formula (IV) and a polyester resin (B') having a structural unit represented by the following formula (V);
$n^A/(m^A + n^A)$ in the formula (I) is from 0.25 to 0.7, and $n^B/(m^B + n^B)$ in the formula (IV) is from 0.1 to 0.7:

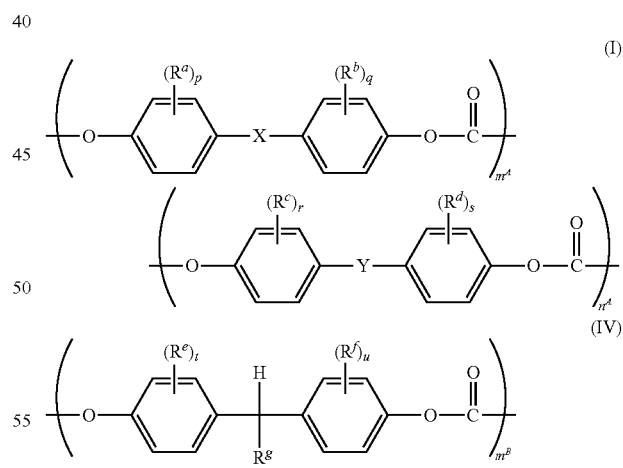

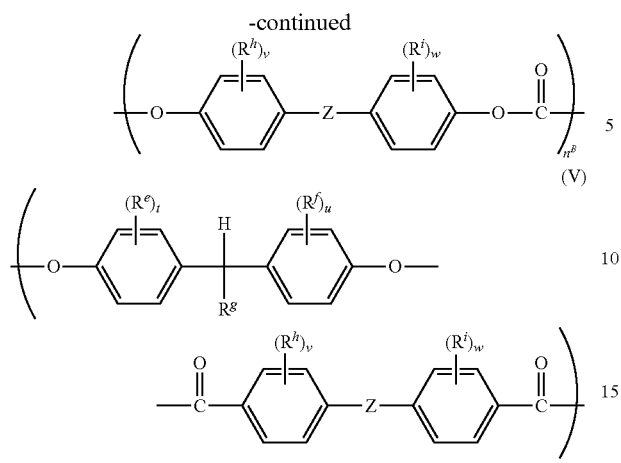

(V)

in the formulas, each of $R^a$, $R^b$, $R^c$, $R^d$, $R^e$, $R^f$, $R^h$ and $R^i$ represents, independently from one another, a halogen atom, a substituted or non-substituted alkyl group having 1 to 8 carbon atoms, a substituted or non-substituted cycloalkyl group having 3 to 8 carbon atoms, or a substituted or non-substituted phenyl group;

each of p, q, r, s, t, u, v and w represents, independently from one another, an integer of 0 to 4;

$R^g$ represents an alkyl group having 1 to 8 carbon atoms;

X represents an alkylene group having 1 to 8 carbon atoms, an isopropylidene group, a sec-butylidene group, a cycloalkylene group having 5 to 15 carbon atoms, a cycloalkylidene group having 5 to 15 carbon atoms, —S—, —SO—, —SO$_2$—, —CO—, or a divalent bonding group that is represented by the following formula (X-1) or the following formula (X-2); the benzene rings that compose formula (X-2) may be substituted with an alkyl group having 1 to 8 carbon atoms or a substituted or non-substituted phenyl group;

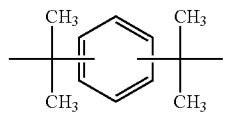

(X-1)

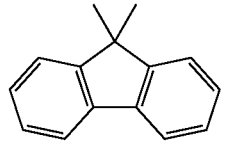

(X-2)

Y represents a single bond or —O—; and each of $m^A$, $n^A$, $m^B$ and $n^B$ represents a composition ratio (mole ratio) of the structural unit;

and Z represents a single bond or —O—.

* * * * *